United States Patent
Ohsawa et al.

(10) Patent No.: US 8,864,213 B2
(45) Date of Patent: Oct. 21, 2014

(54) VEHICLE DOOR FRAME

(71) Applicant: Shiroki Corporation, Fujisawa (JP)

(72) Inventors: Shigenobu Ohsawa, Fujisawa (JP);
Hiroaki Yamazaki, Fujisawa (JP);
Manami Yata, Fujisawa (JP)

(73) Assignee: Shiroki Corporation, Fujisawa-Shi, Kanagawa (JP)

( * ) Notice: Subject to any disclaimer, the term of this patent is extended or adjusted under 35 U.S.C. 154(b) by 0 days.

(21) Appl. No.: 14/348,109

(22) PCT Filed: Sep. 27, 2012

(86) PCT No.: PCT/JP2012/074818
§ 371 (c)(1),
(2), (4) Date: Mar. 28, 2014

(87) PCT Pub. No.: WO2013/047632
PCT Pub. Date: Apr. 4, 2013

(65) Prior Publication Data
US 2014/0239668 A1    Aug. 28, 2014

(30) Foreign Application Priority Data

Sep. 28, 2011 (JP) .................... 2011-212726

(51) Int. Cl.
*B60J 5/04* (2006.01)
(52) U.S. Cl.
CPC .................... *B60J 5/0412* (2013.01)
USPC ..................................... 296/146.5
(58) Field of Classification Search
CPC ............................................. B60J 5/04
USPC ......... 296/146.5, 146.6, 190.11, 191, 193.02, 296/146.8, 146.9; 49/502
IPC ......................................... B60J 5/04
See application file for complete search history.

(56) References Cited

U.S. PATENT DOCUMENTS

| 5,033,236 A * | 7/1991 | Szerdahelyi et al. ........... 49/502 |
| 5,857,732 A * | 1/1999 | Ritchie ...................... 296/146.5 |
| 6,779,829 B2 * | 8/2004 | Chappuis et al. ......... 296/146.5 |
| 2011/0302846 A1 * | 12/2011 | Okada et al. ................... 49/502 |

(Continued)

FOREIGN PATENT DOCUMENTS

| JP | 5633712 | 4/1981 |
| JP | 5857463 | 4/1983 |

(Continued)

OTHER PUBLICATIONS

International Search Report for PCT/JP2012/074818 dated Nov. 6, 2012.

(Continued)

*Primary Examiner* — Pinel Romain
(74) *Attorney, Agent, or Firm* — Millen, White, Zelano & Branigan, P.C.

(57) ABSTRACT

In a door frame for vehicle which is mounted to a door panel via a reinforcing bracket, the door frame has a projecting portion which projects toward the vehicle interior side from a design portion over a range from a frame forming portion, which appears on the outward appearance of the door, to an insertion portion which is fixed to said reinforcing bracket, and the projecting portion is formed into a widened shape which makes the distance between a wall surface on the frame inner peripheral side and a wall surface on the frame outer peripheral side at the insertion portion greater than that at the frame forming portion. Accordingly, the strength of the fixed portion of the door frame to the reinforcing bracket is improved. In addition, the selectivity of welding location between the door frame and the reinforcing bracket is improved.

5 Claims, 24 Drawing Sheets

(56) References Cited

U.S. PATENT DOCUMENTS 6,176,542 B1 * 1/2001 Gooding et al. ............ 296/146.6
6,719,355 B2 * 4/2004 Ornig et al. ................ 296/146.5

FOREIGN PATENT DOCUMENTS

| JP | 2005153768 | | 6/2005 |
| --- | --- | --- | --- |
| JP | 2005313743 | A | 11/2005 |
| JP | 2007145118 | A | 6/2007 |
| JP | 2008201304 | A | 9/2008 |
| JP | 4295069 | | 7/2009 |
| JP | 2009196568 | A | 9/2009 |

OTHER PUBLICATIONS

Aisin Seiki Co Ltd., "Door Frame," Patent Abstracts of Japan, Publication Date: Jun. 16, 2005: English Abstract of JP-2005 153768.

Hirotec Corp., "Door for vehicle," Patent Abstracts of Japan, Publication Date: Nov. 10, 2005; English Abstract of JP-2005 313743.

Toyota Motor Corp., "Slide door structure," Patent Abstracts of Japan, Publication Date: Aug. 14, 2007; English Abstract of JP-2007 145118.

Toyota Motor Corp., "Door structure for vehicle," Patent Abstracts of Japan, Publication Date: Sep. 4, 2008; English Abstract of JP-2008 201304.

Kanto Auto Works Ltd., "Automobile door structure," Patent Abstracts of Japan, Publication Date: Sep. 3, 2009; English Abstract of JP-2009 196568.

Nissan Motor Corporation, "Hinge Attachment Structure," Publication Date: Apr. 19, 1983; English Translation of Claim 1 for JP-S58-57463.

Hino Motor Ltd., "Window Frame Structure of Vehicle Door," Publication Date: Apr. 2, 1981; English Translation of Claim 1 for JP-S56-33712.

* cited by examiner

VEHICLE DOOR FRAME

TECHNICAL FIELD

The present invention relates to a vehicle door frame, and in particular relates to the structure of a portion of the door frame which is joined to a door panel.

BACKGROUND ART

Vehicle doors which are structured such that a door frame (sash) is mounted to a door panel and that a reinforcing bracket (reinforcement member) which supports a door lock mechanism and/or a door mirror is fixed to a joined portion between an inner panel, which constitutes a component of the door panel, and the door frame are known in the art. More specifically, a reinforcing bracket is fixed to the vehicle interior side of the door frame, and this reinforcing bracket is fixed to the inner panel. It is possible to improve the strength of the joined portion between the door frame and the inner panel by interposing the reinforcing bracket, having a high rigidity, therebetween.

CITATION LIST

Patent Literature

Patent Literature 1: Japanese Patent Publication No. 4,295,069

SUMMARY OF INVENTION

Technical Problem

The strength of the door frame is secured by being provided with a projecting portion having a pocket-like or tubular cross-sectional shape which projects toward the vehicle interior side from a design portion that faces toward the vehicle exterior side. Although at least a part of projecting portion is overlaid on a reinforcing bracket and fixed thereto, it is desirable to further increase the strength of the fixed portion between the projecting portion and the reinforcing bracket. In addition, when the door frame and the reinforcing bracket are joined, it is difficult to perform a welding operation with a welding torch inserted into the projecting portion, which is narrow, so that portions capable of being welded are limited.

The present invention has been devised in view of the problems described above, and in a vehicle door in which a projecting portion of a door frame is fixed to a reinforcing bracket, an object of the present invention is to increase the strength of this fixed portion. In addition, an object of the present invention is to provide a vehicle door frame which is superior in selectivity of welding location between the projecting portion of the door frame and the reinforcing bracket.

Solution to Problem

The present invention relates to a vehicle door frame which includes an insertion portion which is inserted in between an inner panel and an outer panel, which constitute a door panel, and is supported therebetween; and a frame forming portion which projects from the door panel to form a window opening, wherein the insertion portion is fixed to the inner panel via a reinforcing bracket. The door frame includes, at the insertion portion and the frame forming portion, a design portion and a projecting portion which projects toward the vehicle interior side from the design portion, wherein the projecting portion is formed from a vehicle interior side surface which faces toward the vehicle interior side, and an inner peripheral side surface and an outer peripheral side surface which are spaced from each other toward the inner peripheral side and the outer peripheral side of the door frame, respectively, with the vehicle interior side surface positioned therebetween. In addition, the projecting portion is characterized by having a widened shape which makes the distance between the inner peripheral side surface and the outer peripheral side surface at the insertion portion greater than that at the frame forming portion, wherein the widened shaped projecting portion is fixed to the reinforcing bracket.

It is desirable for the projecting portion at the insertion portion to be formed into a width-gradually-changing portion which gradually increases the distance between the inner peripheral side surface and the outer peripheral side surface in a direction away from the frame forming portion.

Alternatively, it is possible for the projecting portion at the insertion portion to stepwise increase the distance between the inner peripheral side surface and the outer peripheral side surface toward a side far from the frame forming portion with respect to a side near the frame forming portion.

The formation of the insertion portion of the door frame into a widened shape makes it easy to insert a welding torch into the projecting portion, thus increasing the number of locations capable of being welded. For instance, it is desirable to select a vehicle interior side surface, as a welding location of the door frame to the reinforcing bracket, which constitutes the bottom of the projecting portion and to form a hole, formed in the vehicle interior side surface, for welding the projecting portion to the reinforcing bracket.

It is advisable for the reinforcing bracket to include a fixed portion which is superposed on and fixed to at least the vehicle interior side surface and the outer peripheral side surface of the projecting portion that has the widened shape, and a flange portion which extends from the fixed portion in a direction along the design portion, wherein the reinforcement bracket is fixed to the inner panel at the flange portion.

Advantageous Effects of Invention

According to the present invention described above, the strength of the door frame is improved because the projecting portion, which is fixed to the reinforcing bracket, is formed into a widened shape which increases the bending rigidity (second moment of area). In addition, the selectivity of welding location between the projecting portion and the reinforcing bracket is improved due to the formation of the projecting portion into the widened shape.

DESCRIPTION OF EMBODIMENTS

Figure 1:
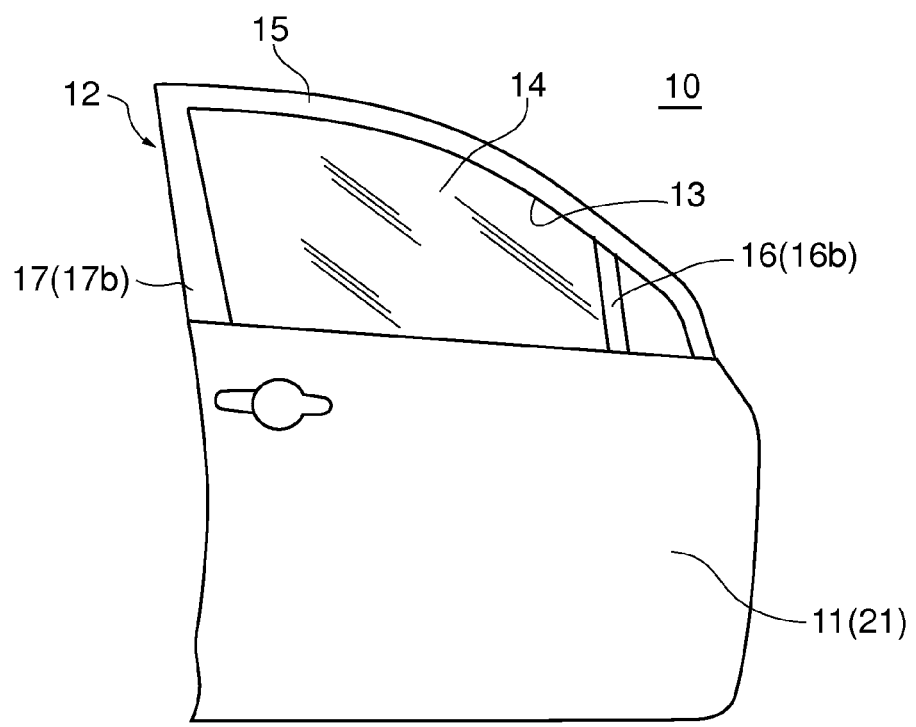
FIG. 1 is a view of a vehicle door to which the present invention is applied, viewed from the vehicle exterior side.

FIG. 1 shows a schematic structure of a front door (hereinafter referred to as a door) 10, of a passenger vehicle, to which the present invention is applied. The door 10 is provided with a door panel 11 and a door frame 12, and the area of the door 10 which is surrounded by the upper edge of the door panel 11 and the inner periphery of the door frame 12 defines a window opening 13. A vertically movable door glass 14 is provided in the window opening 13. The door frame 12 is provided with an upper frame 15 which forms the upper edge of the door 10, a front side frame 16 which extends downward from the front end of the upper frame 15, and a rear side frame 17 which extends downward from the rear end of the upper frame 15. In the following descriptions, the side of the door frame 12 which faces the window opening 13 is referred to as the inner peripheral side and the opposite side of the door frame 12 is referred to as the outer peripheral side. In addition, the forward/rearward direction and the upward/downward direction in the following descriptions correspond to the forward/rearward direction and the upward/downward direction of the vehicle, to which the door 10 is mounted, respectively.

The door panel 11 is provided with an outer panel 21 (FIG. 1) which is positioned on the vehicle exterior side and an inner panel 22 which is positioned on the vehicle interior side.

Figure 2:
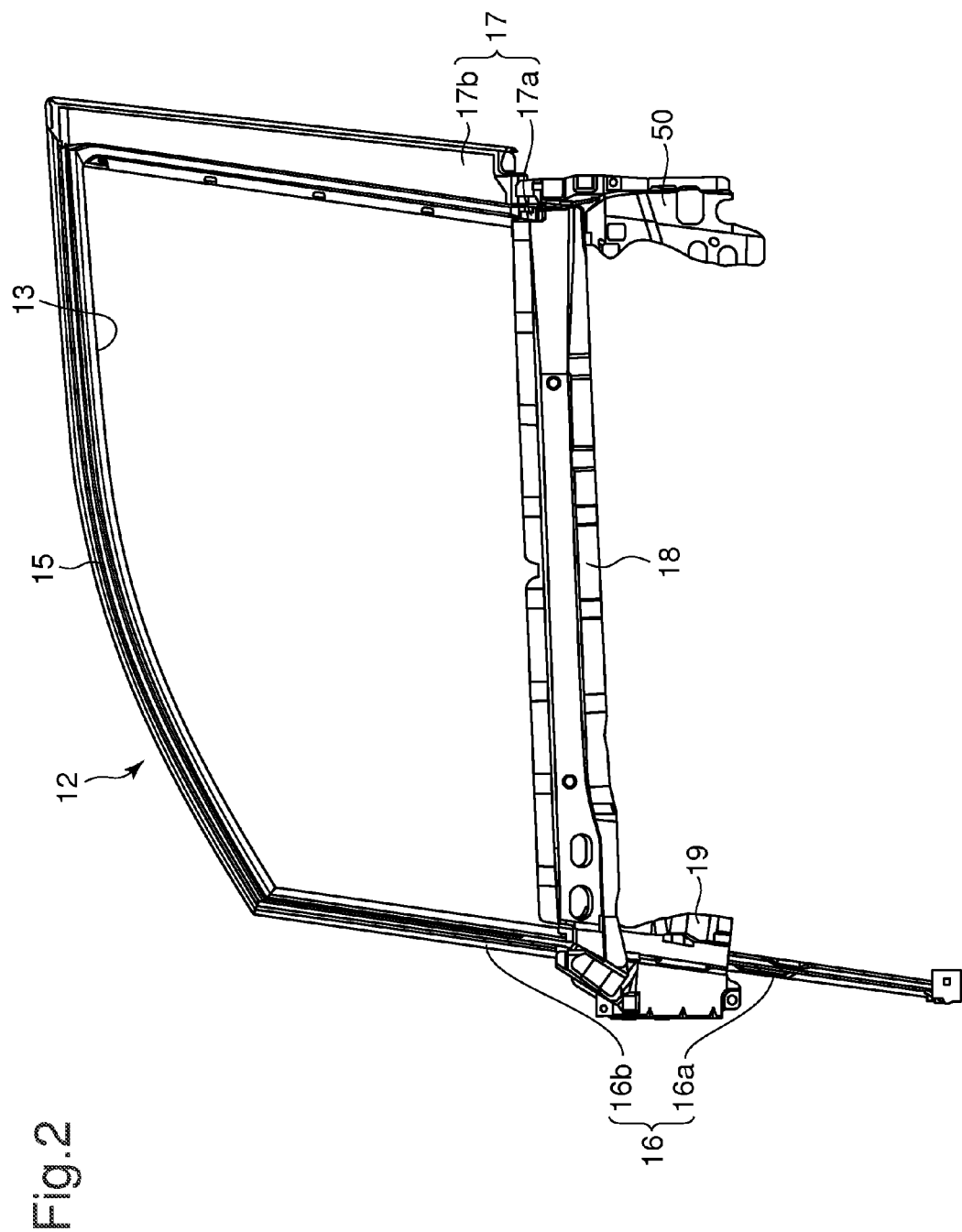
FIG. 2 is a view of a door frame and a reinforcement member that constitute components of the door shown in FIG. 1, viewed from the vehicle interior side.
Figure 3:
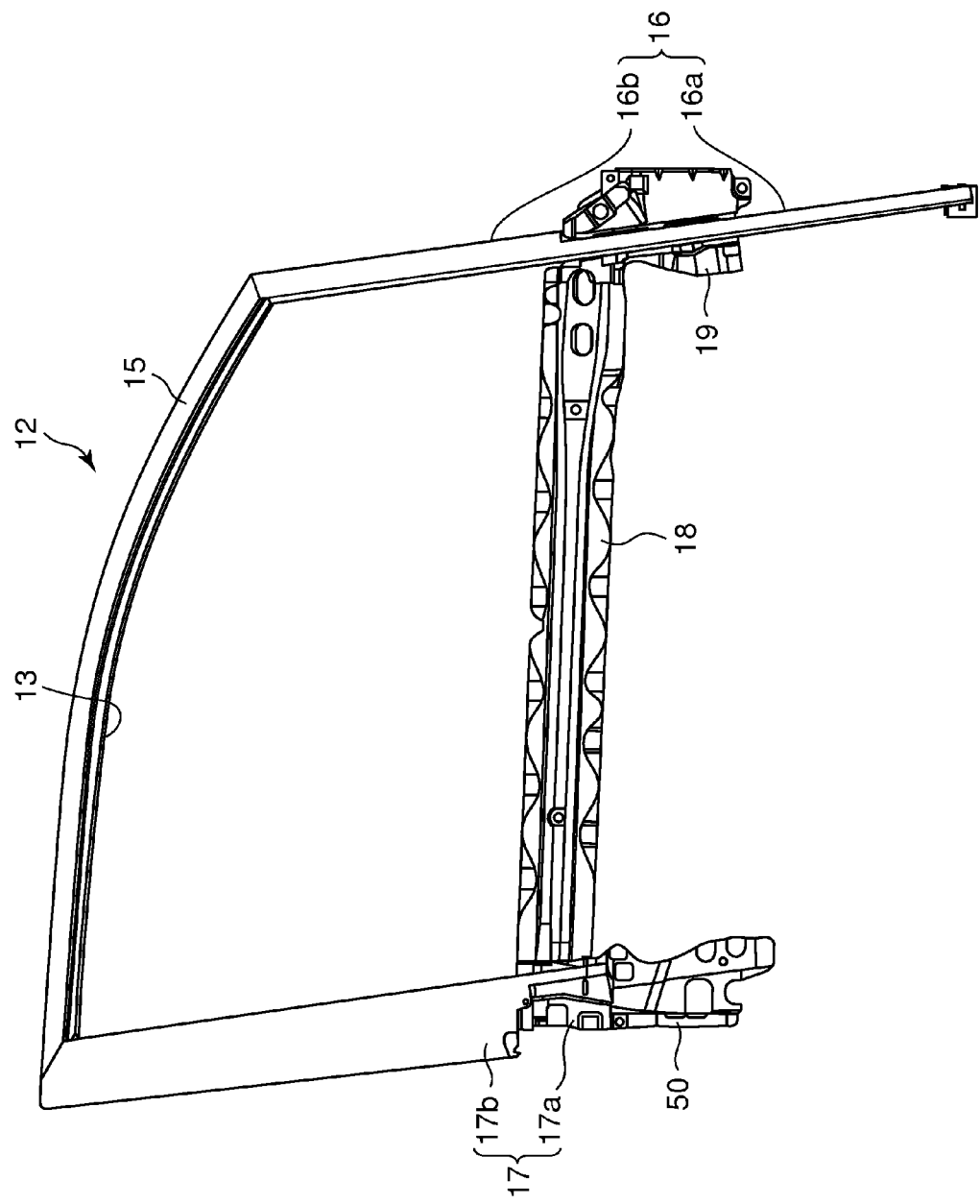
FIG. 3 is a view of the door frame and the reinforcement member that constitute components of the door shown in FIG. 1, viewed from the vehicle exterior side.
Figure 14:
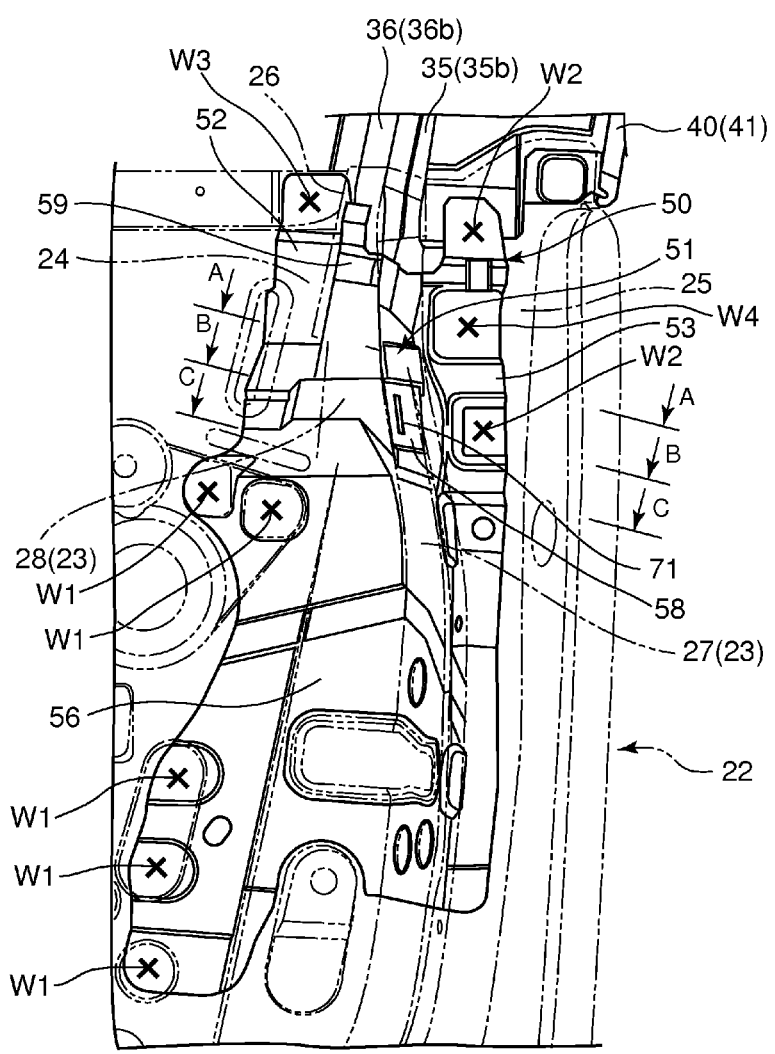
FIG. 14 is a view showing a state where the insertion portion of the rear side frame, the lock reinforcement member and the inner panel are overlaid and fixed together, viewed from the vehicle interior side.
Figure 15:
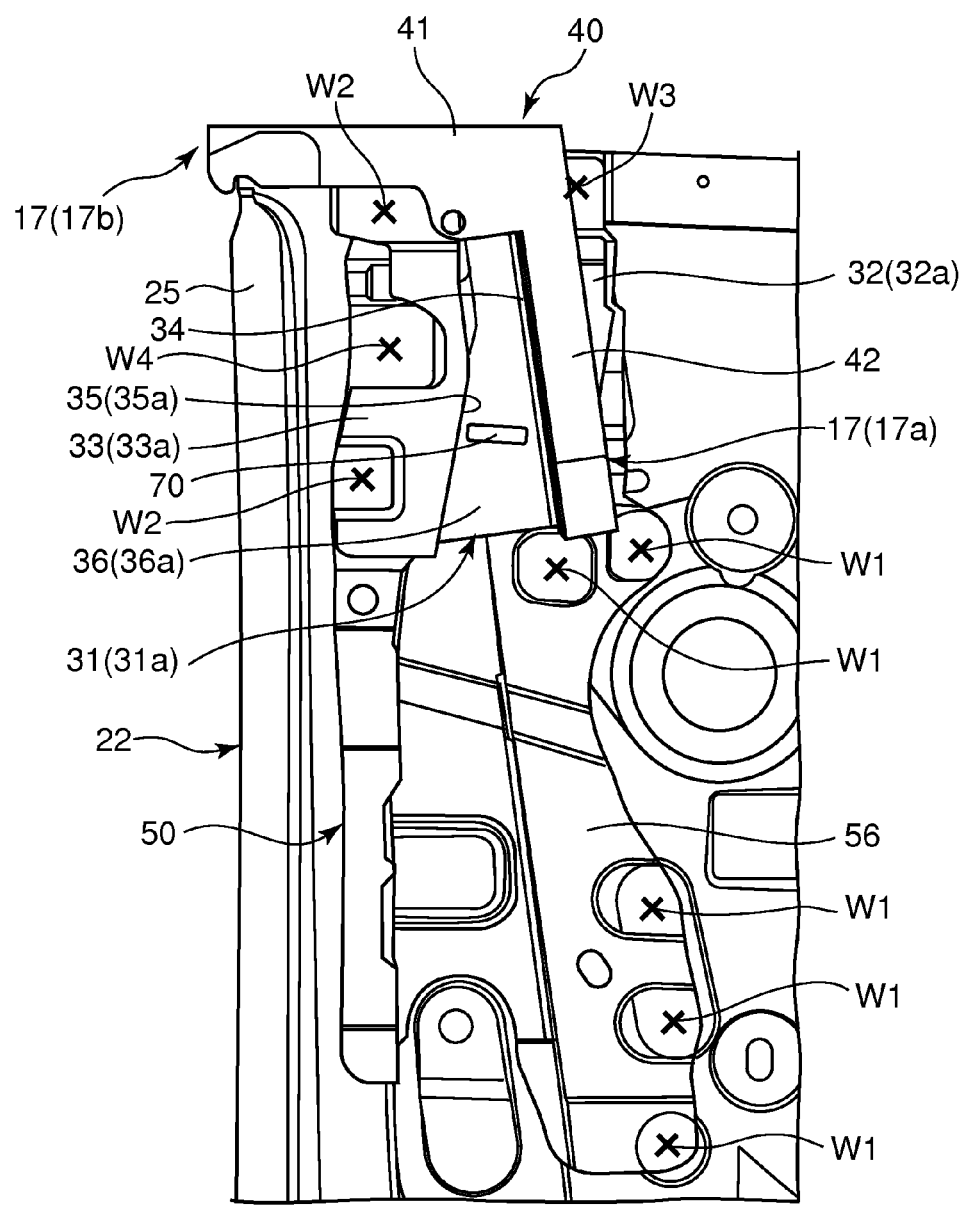
FIG. 15 is a view showing the state shown in FIG. 14, viewed from the vehicle exterior side.
Figure 16:
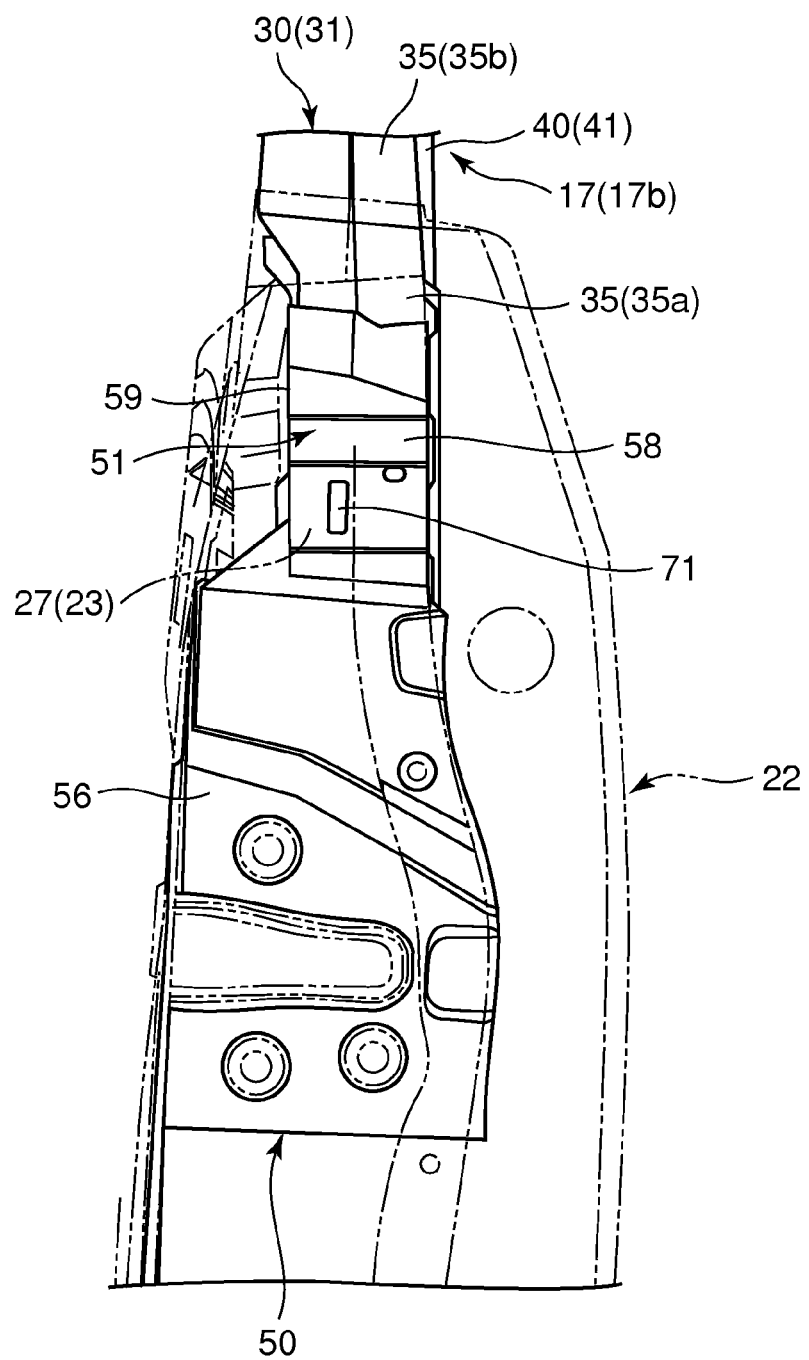
FIG. 16 is a view showing the state shown in FIG. 14, viewed from the rear.

FIGS. 14 through 19 show a part of the inner panel 22, and the inner panel 22 is shown by imaginary lines (two-dot chain lines) in FIGS. 14 and 16 so that components which are positioned behind (on the vehicle exterior side) the inner panel 22 and are overlaid thereon as viewed from the vehicle interior side are easy to see. As shown in FIGS. 2 and 3, lower portions of the front side frame 16 and the rear side frame 17 are formed as insertion portions 16a and 17a, which are inserted into the space between the outer panel 21 and the inner panel 22 and supported therebetween. In the completed state of the door 10 shown in FIG. 1, the insertion portions 16a and 17a are not outwardly exposed, and only frame exterior portions 16b and 17b project upward from the door panel 11 to form the window opening 13.

As shown in FIGS. 2 and 3, an inner beltline reinforcement member 18, a front bracket 19 and a lock reinforcement member 50 are provided at a position where the insertion portion 16a of the front side frame 16 and the insertion portion 17b of the rear side frame 17 are connected. The front bracket 19 supports a door mirror and the lock reinforcement member 50 supports a door lock mechanism. The inner beltline reinforcement member 18 is extended in the forward/rearward direction, a portion of the inner beltline reinforcement member 18 in the vicinity of the front end thereof is fixed to the front bracket 19, and a portion of the inner beltline reinforcement member 18 in the vicinity of the rear end thereof is fixed to the lock reinforcement member 50. The front bracket 19 is fixed to the insertion portion 16a of the front side frame 16. The lock reinforcement member 50 is fixed to the insertion portion 17a of the rear side frame 17 by a structure which will be discussed later. The insertion portions 16a and 17a of the door frame 12, the inner beltline reinforcement member 18, the front bracket 19 and the lock reinforcement member 50 are each fixed to the inner panel 22. The door frame 12 is further provided on the vehicle exterior side of the inner beltline reinforcement member 18 with an outer beltline reinforcement member not shown in the drawings. Similar to the inner beltline reinforcement member 18, a portion of the outer beltline reinforcement member in the vicinity of the front end thereof is fixed the front bracket 19 and the inner panel 22, and a portion of the outer beltline reinforcement member in the vicinity of the rear end thereof is fixed the lock reinforcement member 50 and the inner panel 22. The door 10 according to the present embodiment has a feature in the joined portion between the rear side frame 17 and the lock reinforcement member 50, and this feature will be discussed hereinafter.

Figure 4:
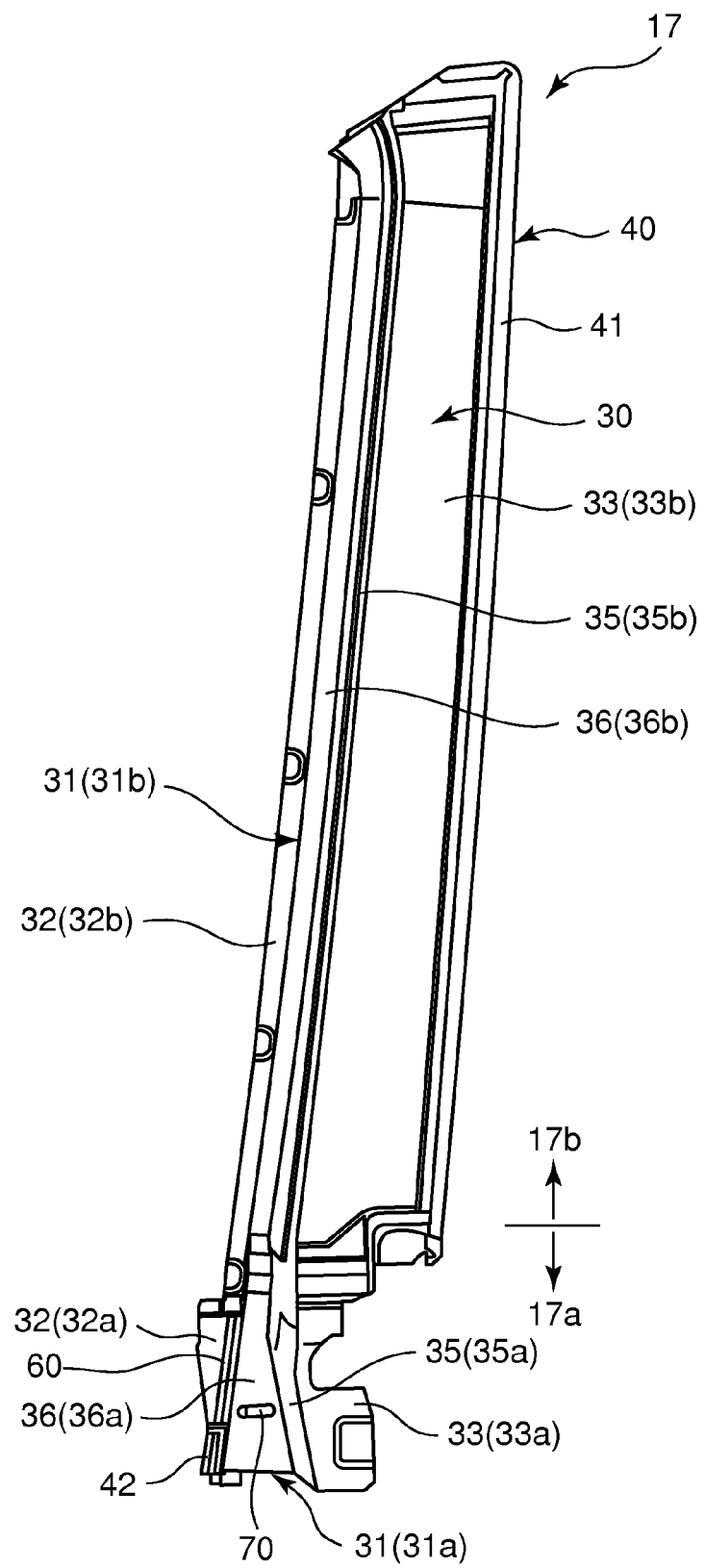
FIG. 4 is a view of a rear side frame that constitutes a component of the door frame, viewed from the vehicle interior side.
Figure 5:
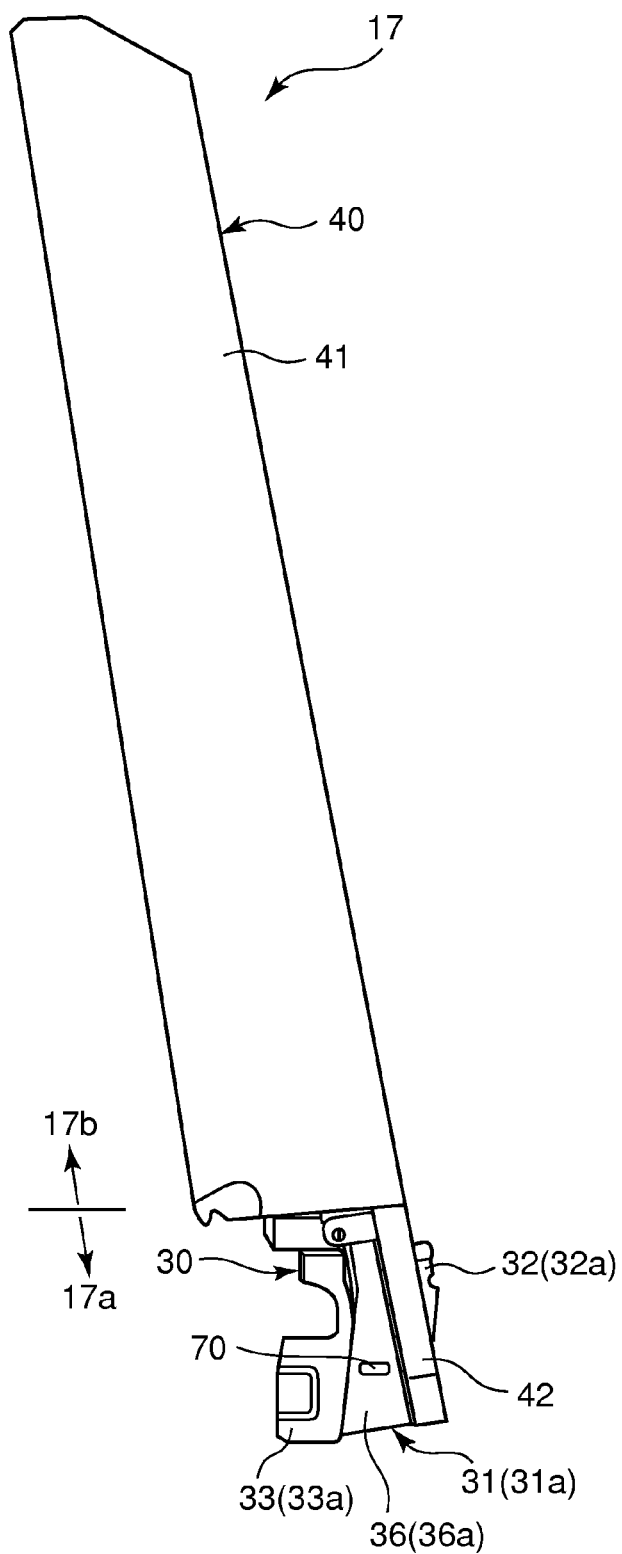
FIG. 5 is a view of the rear side frame, viewed from the vehicle exterior side.
Figure 6:
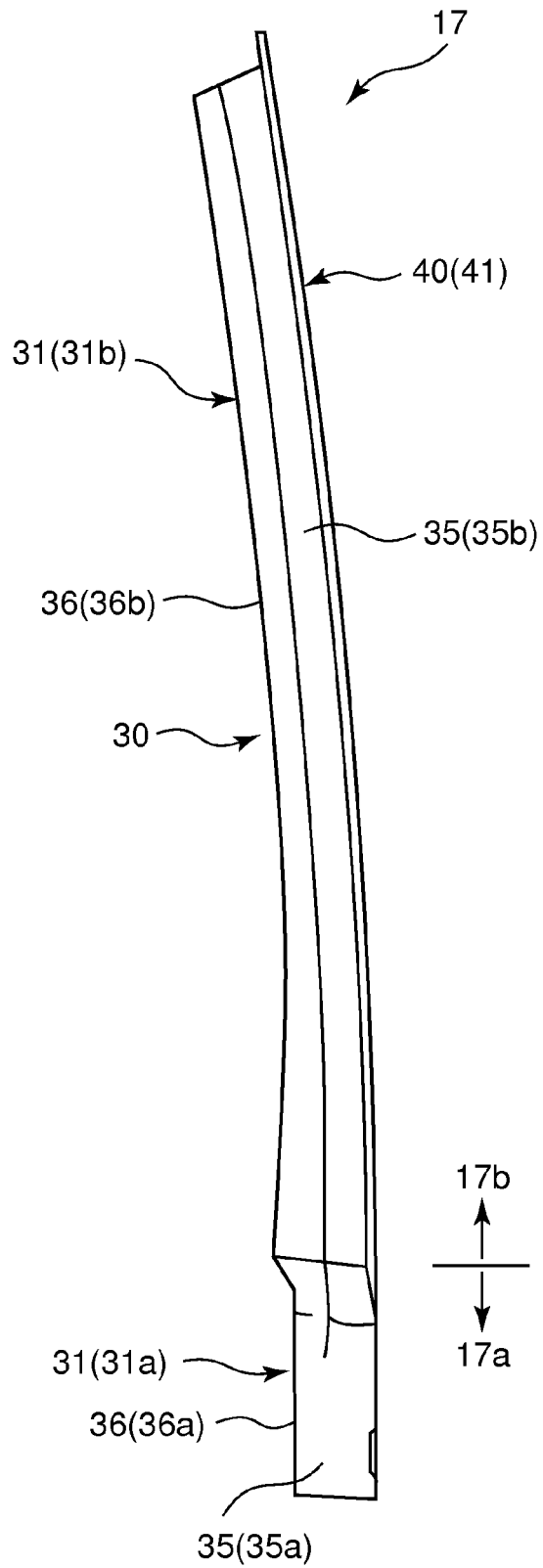
FIG. 6 is a view of the rear side frame, viewed from the rear.
Figure 7:
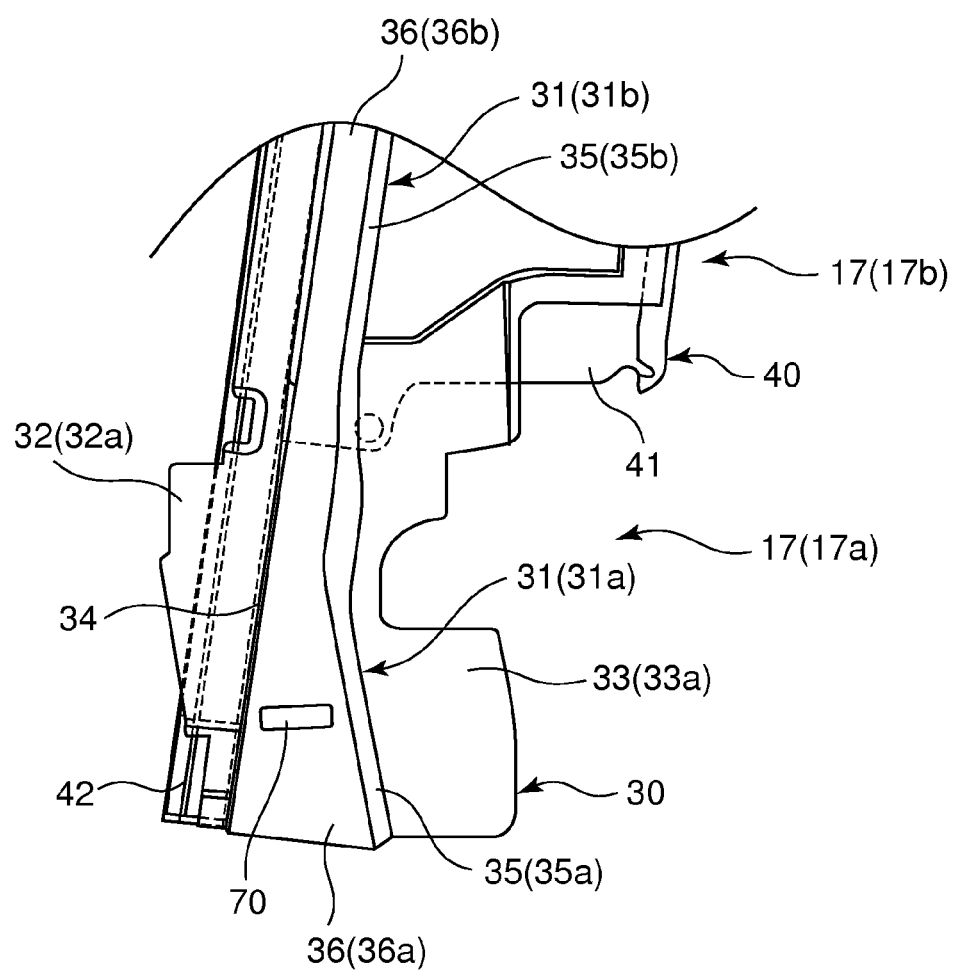
FIG. 7 is an enlarged view of an insertion portion of the rear side frame.

FIGS. 4 through 6 show only the rear side frame 17 out of the components of the door frame 12. The rear side frame 17 is formed of a combination of an inner frame 30 positioned on the vehicle interior side and an outer frame 40 positioned on the vehicle exterior side. Each of the inner frame 30 and the outer frame 40 is formed of a sheet metal material. The inner frame 30 is provided with a projecting portion 31 having a pocket-like cross section which projects toward the vehicle interior side, and an inner peripheral side flange portion 32 and an outer peripheral side flange portion 33 which project from the projecting portion 31 from either side thereof. As projecting-portion forming surfaces which form the projecting portion 31, the inner frame 30 is provided with an inner peripheral side wall surface (inner peripheral side surface portion) 34 and an outer peripheral side wall surface (outer peripheral side surface) 35 which face each other while being spaced from each other toward the inner peripheral side and the outer peripheral side of the door frame 12 (in the forward/rearward direction), respectively, and the inner frame 30 is further provided with a vehicle interior side wall surface (vehicle interior side surface) 36 which connects the inner peripheral side wall surface 34 and the outer peripheral side wall surface 35 and faces toward the vehicle interior side. The inner peripheral side wall surface 34 is continuous with the inner peripheral side flange portion 32, and the outer peripheral side wall surface 35 is continuous with the outer peripheral side flange portion 33. The outer peripheral side wall surface 35 serves as a base surface which holds a weather strip (not shown) on the frame exterior portion 17b.

Figure 17:
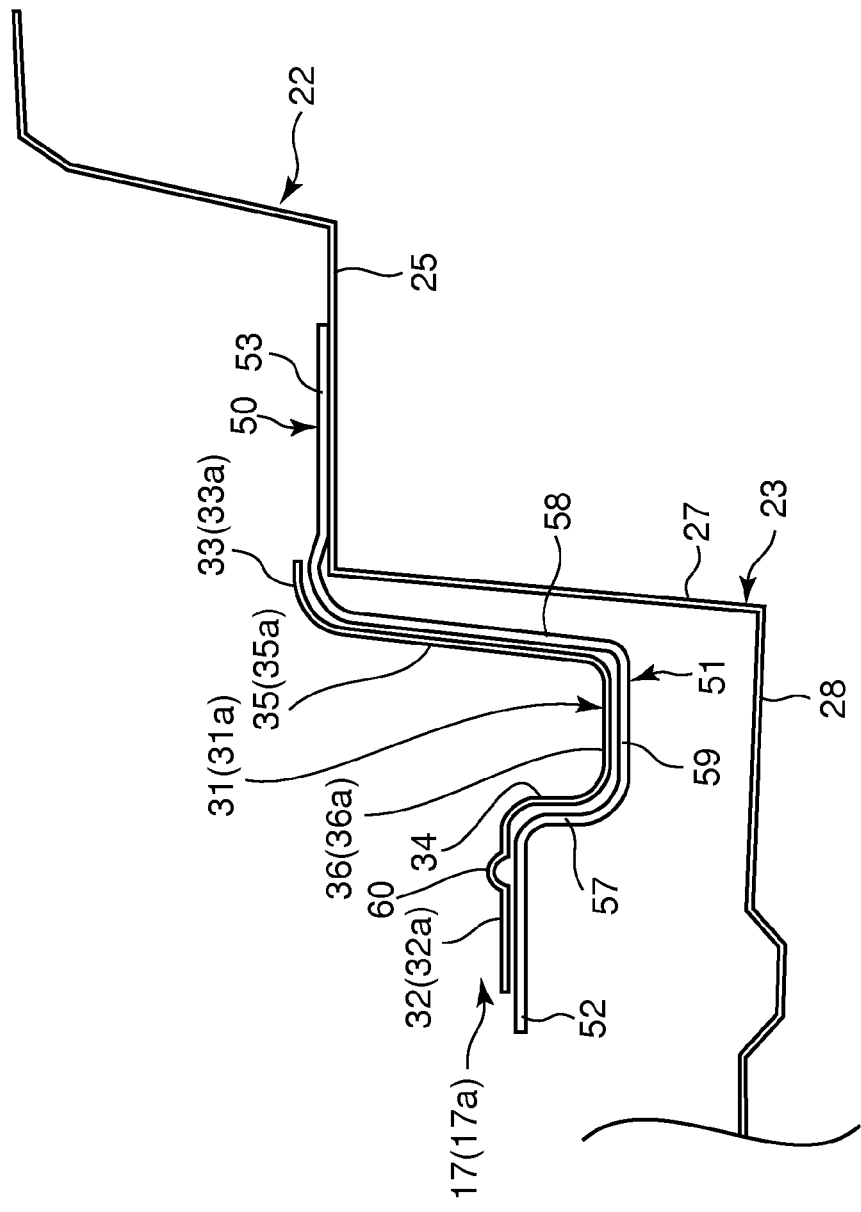
FIG. 17 is a cross sectional view taken along the line A-A shown in FIG. 14.
Figure 18:
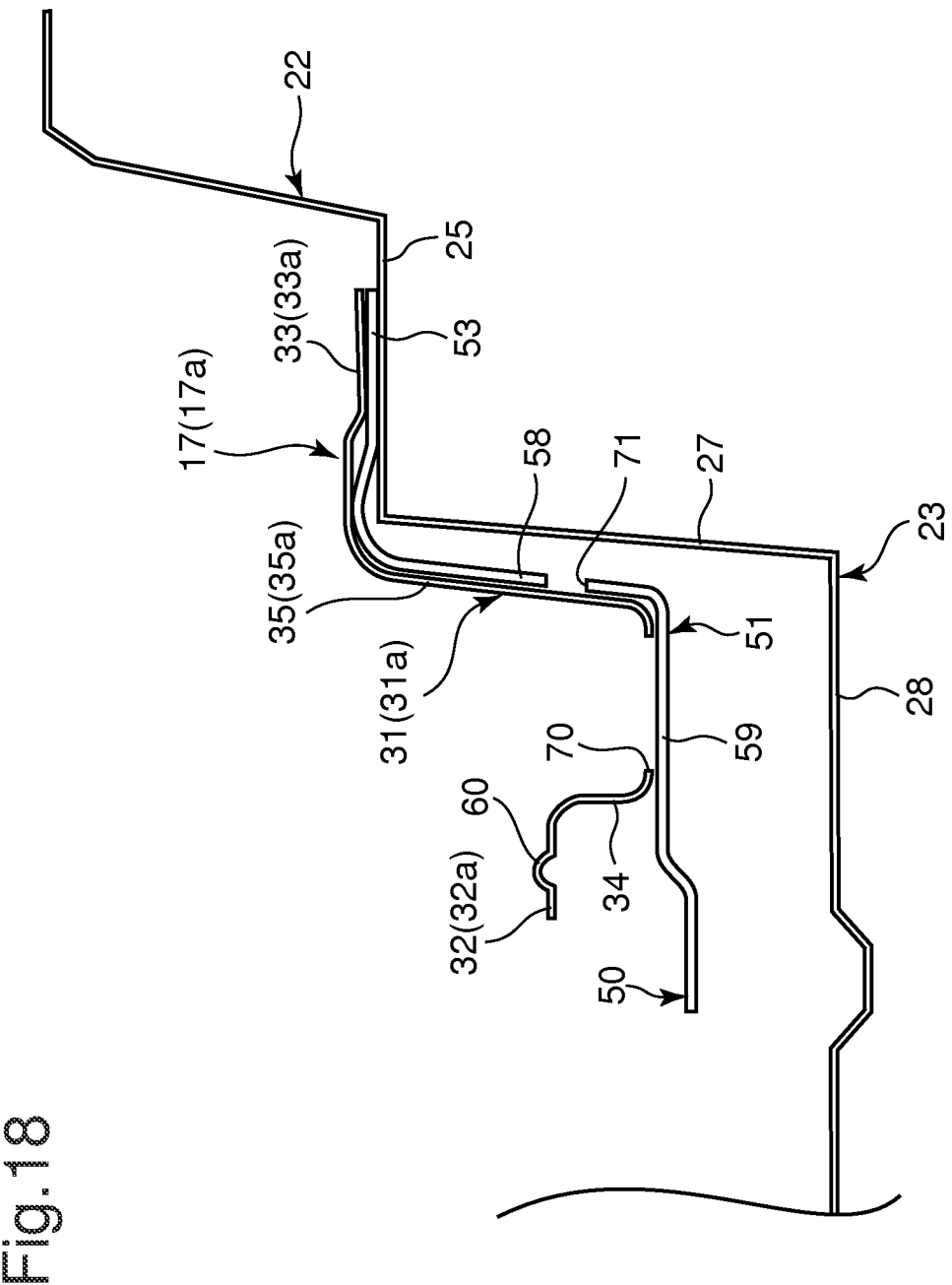
FIG. 18 is a cross sectional view taken along the line B-B shown in FIG. 14.
Figure 19:
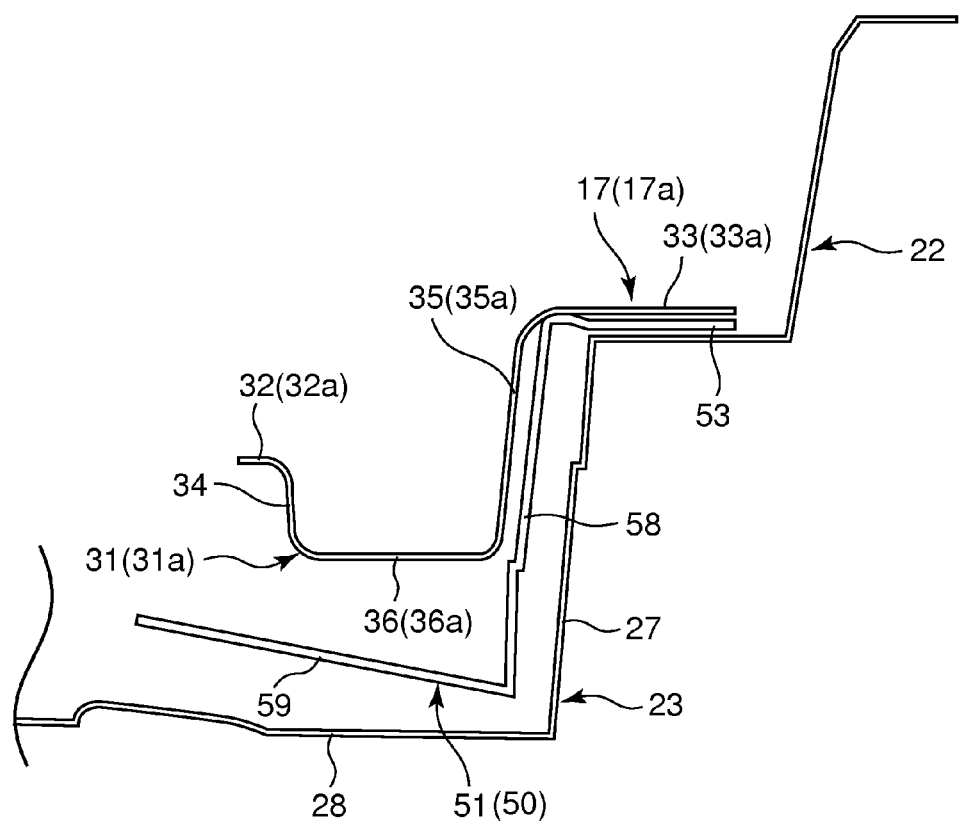
FIG. 19 is a cross sectional view taken along the line C-C shown in FIG. 14.
Figure 20:
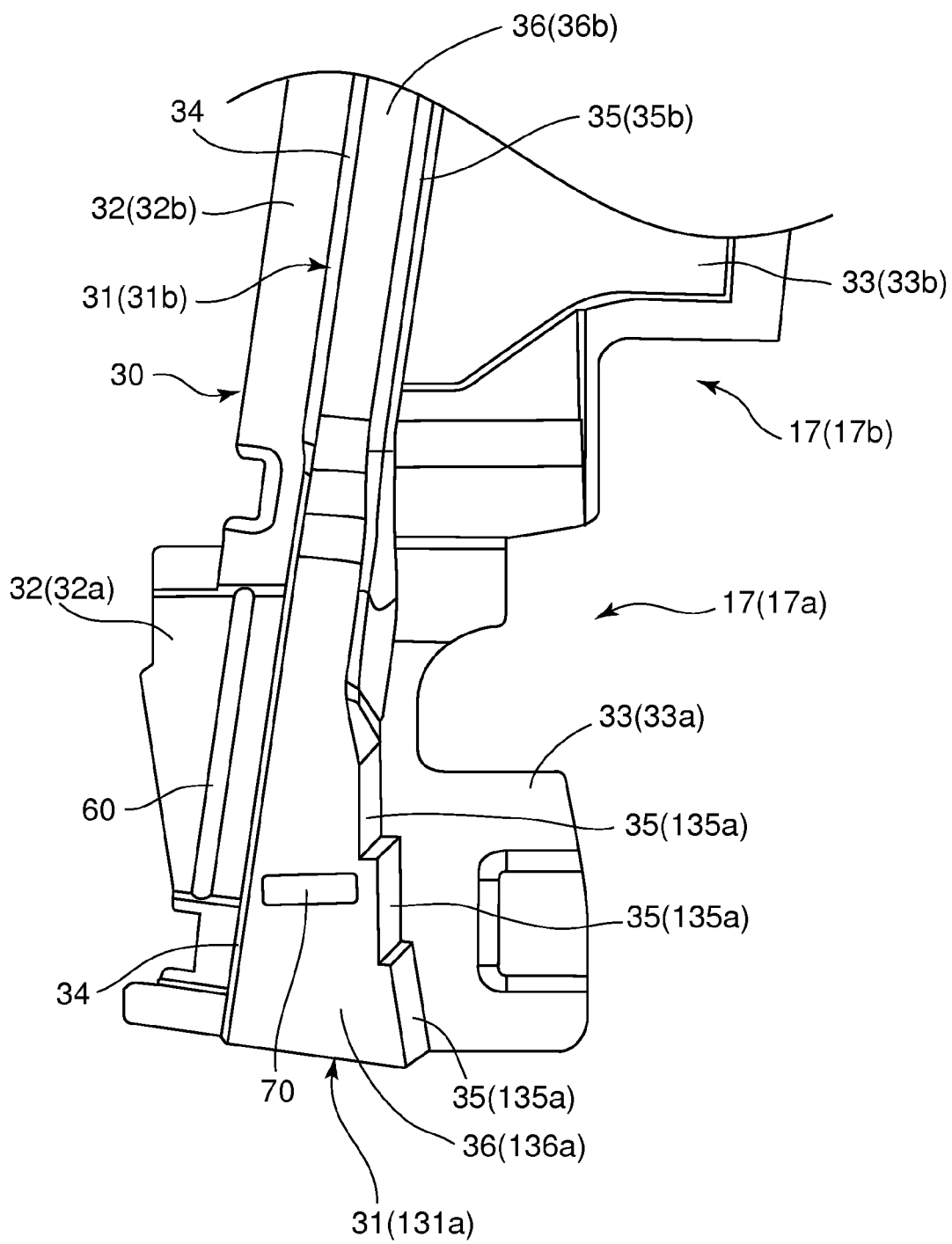
FIG. 20 is a view of the rear side frame of a second embodiment, viewed from the vehicle interior side.
Figure 21:
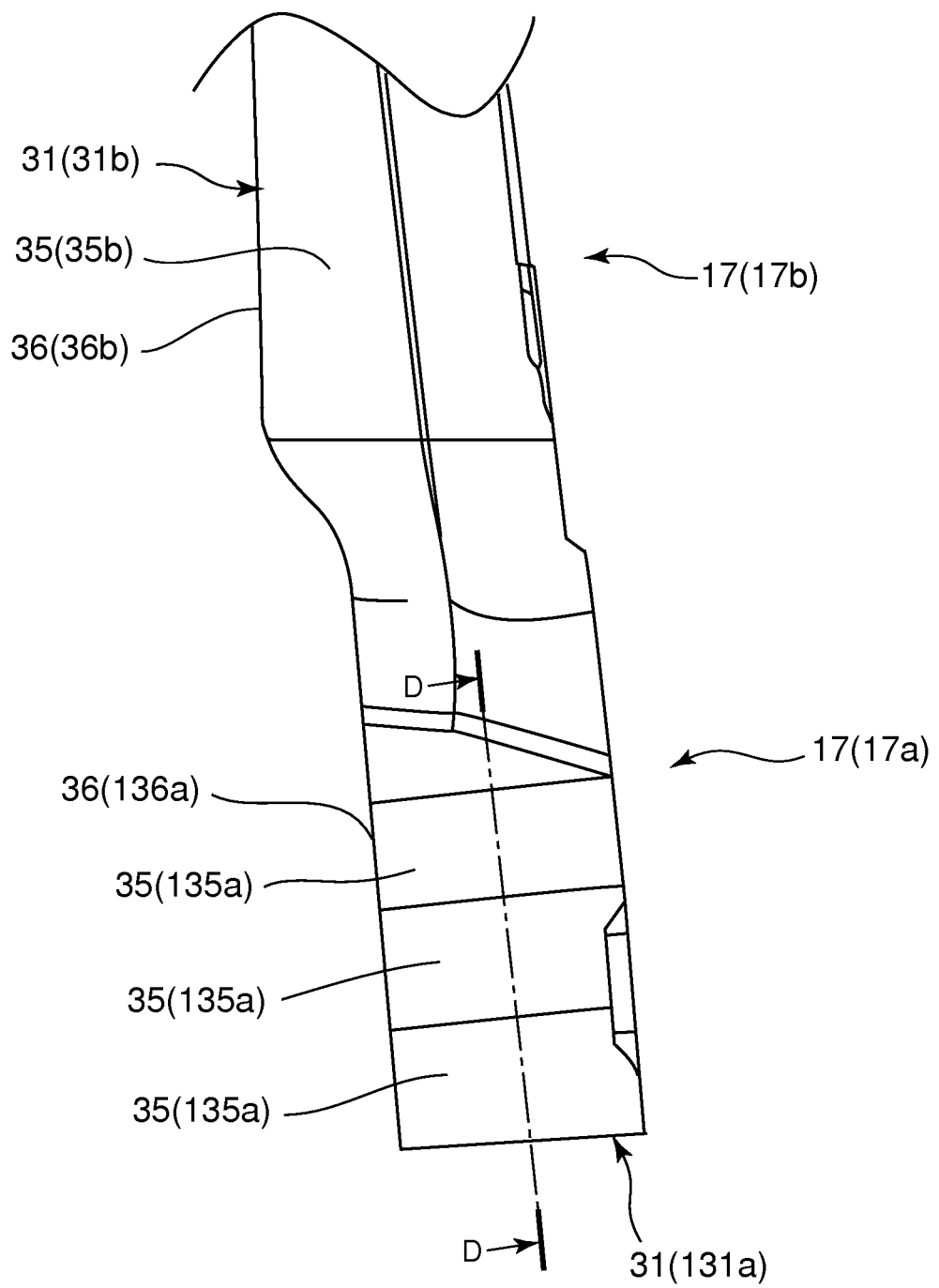
FIG. 21 is a view of the rear side frame of the second embodiment, viewed from the rear.
Figure 22:
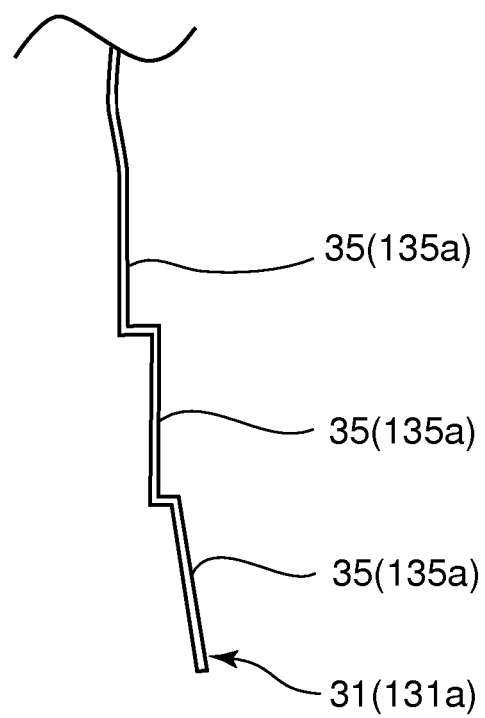
FIG. 22 is a cross sectional view taken along the line D-D shown in FIG. 21.
Figure 23:
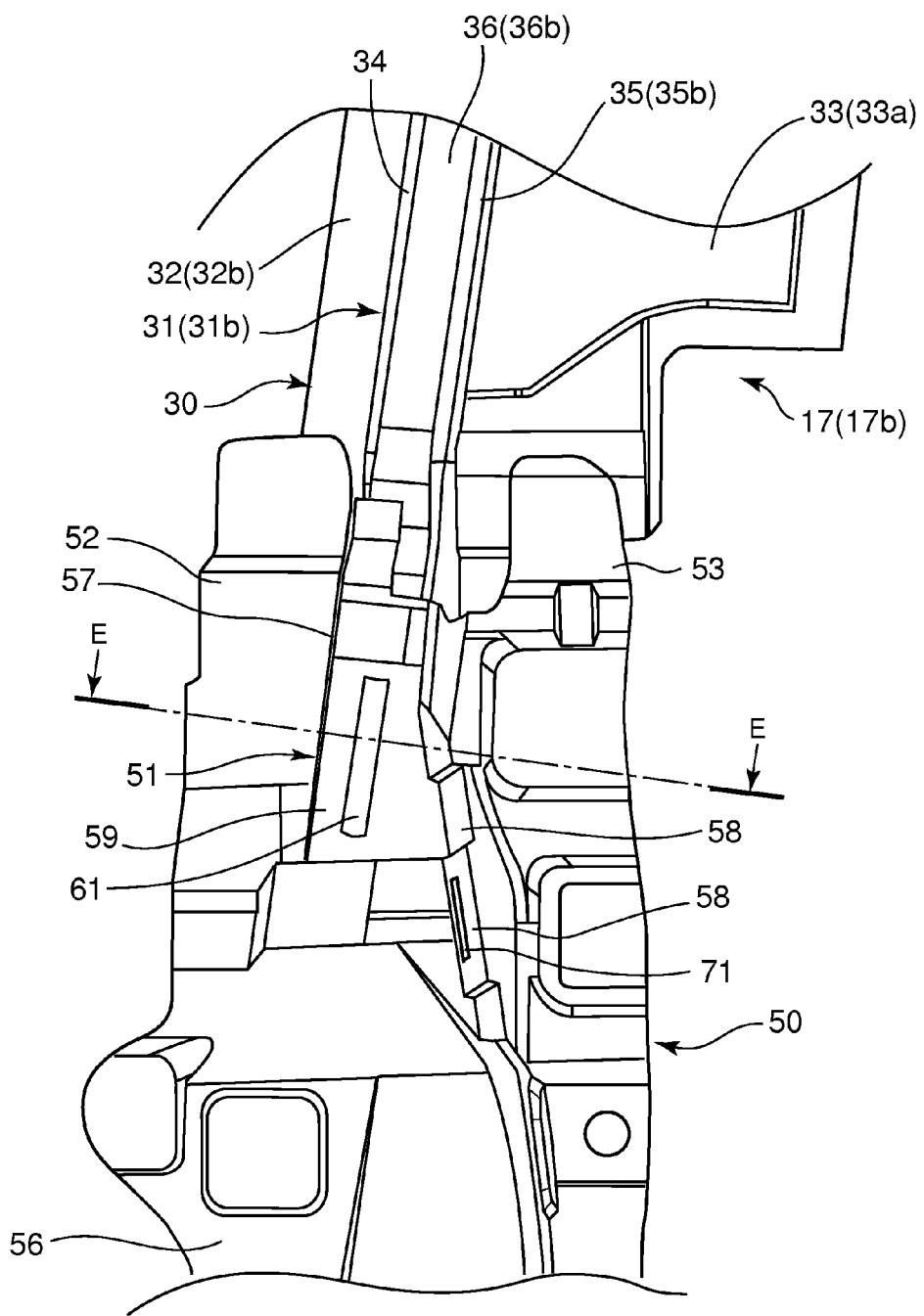
FIG. 23 is a view showing a state where the rear side frame is fixed to the lock reinforcement member in the second embodiment, viewed from the vehicle interior side.
Figure 24:
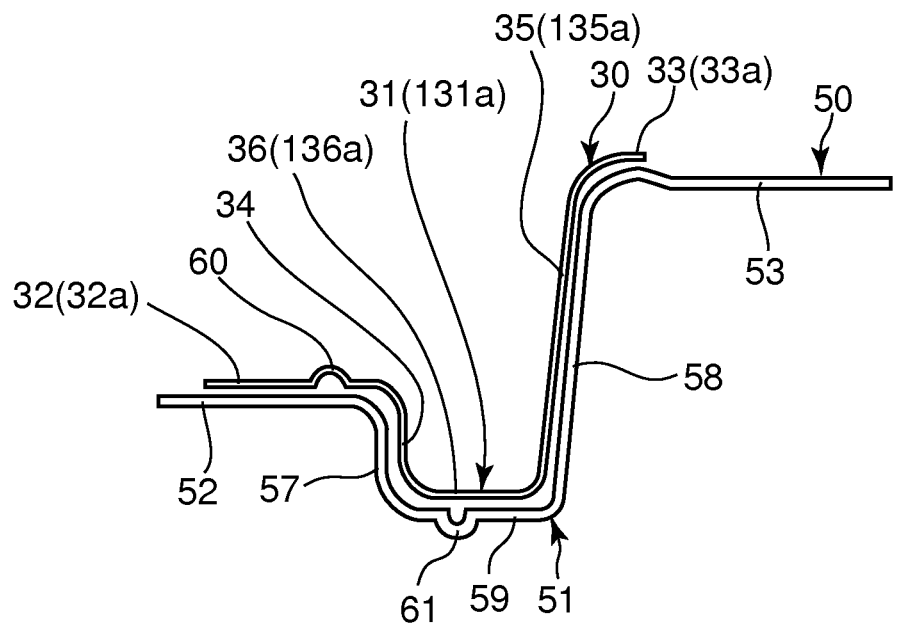
FIG. 24 is a cross sectional view taken along the line E-E shown in FIG. 23.

FIGS. 17 through 19 show cross sectional shapes of the rear side frame 17 at the insertion portion 17a; at the frame exterior portion 17b also, the rear side frame 17 has cross sectional shapes corresponding to these cross sectional shapes. However, the detailed shapes of the projecting portion 31, the inner peripheral side flange portion 32 and the outer peripheral side flange portion 33 at the insertion portion 17a are different from those of the frame exterior portion 17b. The projecting portion 31 at the insertion portion 17a is made greater in sectional area than the projecting portion 31 at the frame exterior portion 17b as shown in FIGS. 3 and 5. More specifically, the distance between the inner peripheral side wall surface 34 at the frame exterior portion 17b and the outer peripheral side wall surface 35 at the frame exterior portion 17b (hereinafter also referred to as a reference surface 35b) is substantially constant, whereas the outer peripheral side wall surface 35 at the insertion portion 17a (hereinafter also referred to as a widened inclined surface 35a) is formed as an inclined surface which is inclined with respect to the inner peripheral side wall surface 34 at the insertion portion 17a so that the distance between the inner peripheral side wall surface 34 and the widened inclined surface 35a increases from the side near the frame exterior portion 17b (from the upper side) toward the side far from the frame exterior portion 17b (toward the lower side). Correspondingly, the width of the vehicle interior side wall surface 36 at the frame exterior portion 17b (hereinafter also referred to as a reference width surface 36b) is substantially constant, whereas the vehicle interior side wall surface 36 at the insertion portion 17a (hereinafter also referred to as a width-gradually-changing surface 36a) is formed into a flared out shape that is gradually widened toward the side far from the frame exterior portion 17b (toward the lower side) from the side near the frame exterior portion 17b (from the upper side). Therefore, the projecting portion 31 on the insertion portion 17a side is greater in width in the forward/rearward direction than that on the frame exterior portion 17b side. In the following descriptions, the projecting portion 31 on the insertion portion 17a side will be referred to as a widened frame portion 31a and the projecting portion 31 on the frame exterior portion 17b side will be referred to as a normal-width frame portion 31b. FIGS. 17 through 19 show variations of a cross sectional shape of the widened frame portion 31a at a different position on the insertion portion 17a.

The inner peripheral side flange portion 32 of the inner frame 30 is formed so that the inner peripheral side flange portion 32 on the frame exterior portion 17b is greater in width than the inner peripheral side flange portion 32 on the insertion portion 17a, and the inner peripheral side flange portion 32 on the insertion portion 17a side and the inner peripheral side flange portion 32 on the frame exterior portion 17b side are discriminated from each other and designated by reference marks 32a and 32b, respectively. On the other hand, the outer peripheral side flange portion 33 is formed so that the outer peripheral side flange portion 33 on the frame exterior portion 17b is smaller in width than the outer peripheral side flange portion 33 on the insertion portion 17a, and the outer peripheral side flange portion 33 on the insertion portion 17a side and the outer peripheral side flange portion 33 on the frame exterior portion 17b side are discriminated from each other and designated by reference marks 33a and 33b, respectively. In addition, a bead 60 which projects toward the vehicle exterior side is formed on the inner peripheral side flange portion 32a of the inner frame 30 (FIGS. 4 and 17). The formation of the bead 60 improves the bending rigidity of the inner frame 30.

The outer frame 40 is provided with a design surface 41 which faces toward the vehicle exterior side and a glass guide portion 42 having a concave cross sectional shape which is formed by bending the inner peripheral side edge of the design surface 41 toward the vehicle interior side. As shown in FIGS. 4 through 7, the outer frame 40 is attached to the vehicle exterior side of the inner frame 30 and is fixed to the inner frame 30 by a hemming process in which the edge of the design surface 41 is folded toward the vehicle interior side to hold and fix an edge of the inner frame 30 in a sandwiched manner or by welding predetermined portions. In this fixed state, the design surface 41 fully covers the inner frame 30 at the frame exterior portion 17b, and the glass guide portion 42 is positioned along the inner peripheral side flange portion 32 of the inner frame 30. The glass guide portion 42 is extended from the upper edge of the rear side frame 17 to a portion thereof in the vicinity of the lower edge of the rear side frame 17; in the completed state of the door frame 12, an edge of the door glass 14 is moved up and down along the glass guide portion 42. A glass run not shown in the drawings is held in the glass guide portion 42. This glass run is provided with lips which elastically hold the edge of the door glass 14 that is inserted into the design surface 41 by sandwiching the side surfaces of the edge of the door glass 14 from the vehicle interior side and the vehicle exterior side. Although the details are omitted, a glass guide portion which is continuous with the glass guide portion 42 of the rear side frame 17 is also formed on the upper frame 15 and the front side frame 16.

As described above, the entire outer frame 40, and the inner peripheral side flange portion 32 and the outer peripheral side flange portion 33 of the inner frame 30 constitute a design portion of the rear side frame 17 which faces toward the vehicle exterior side, and the rear side frame 17 has a cross sectional shape which makes the projecting portion 31 of the inner frame 30 project toward the vehicle interior side from this design portion. In the insertion portion 17a, although a major portion of the outer frame 40 does not exist, the design portion is formed by the inner peripheral side flange portion 32a and the outer peripheral side flange portion 33a of the inner frame 30.

Figure 8:
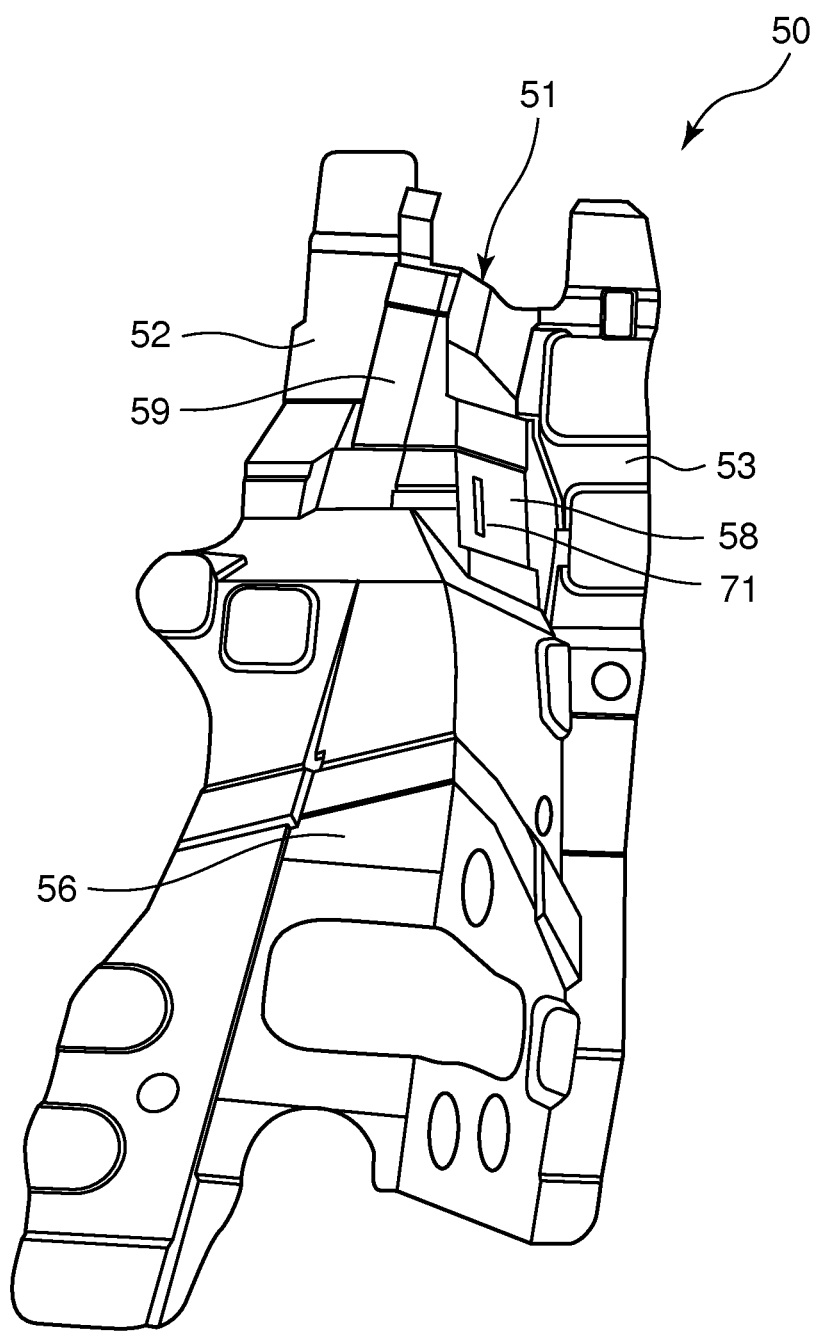
FIG. 8 is a view of a lock reinforcement member, viewed form the vehicle interior side.
Figure 9:
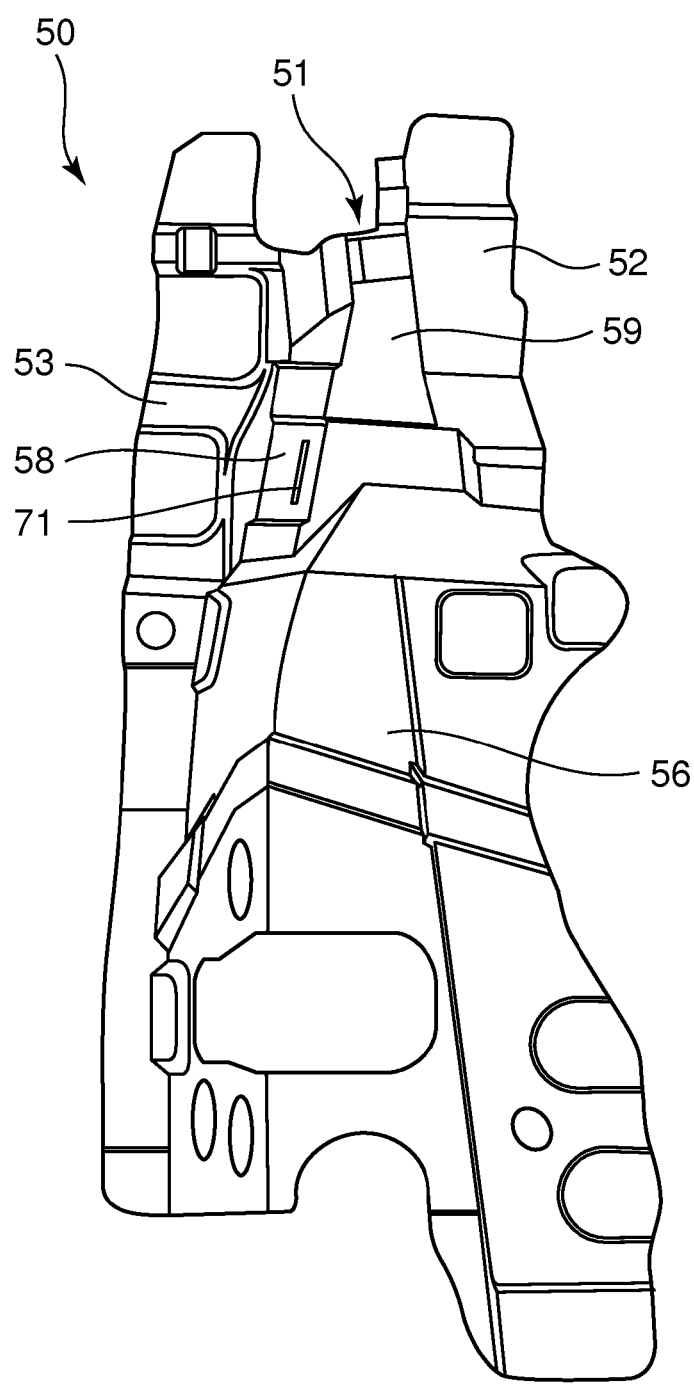
FIG. 9 is a view of the lock reinforcement member, viewed from the vehicle exterior side.
Figure 10:
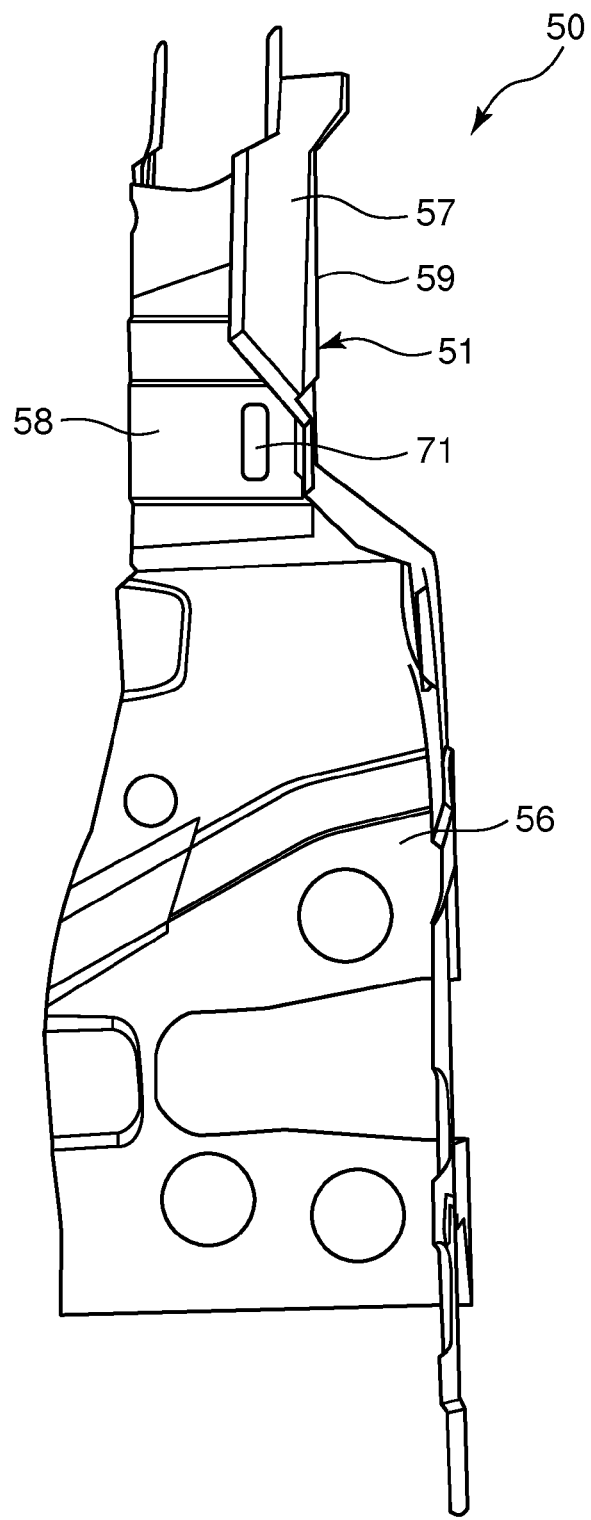
FIG. 10 is a view of the lock reinforcement member, viewed form the front.

The lock reinforcement member 50 is formed of a sheet metal material by press working and has a shape so as to cover the insertion portion 17a of the rear side frame 17 from the vehicle interior side. As shown in FIGS. 8 through 10, the lock reinforcement member 50 is provided with a fitting depressed portion (fixed portion) 51 which projects toward the vehicle interior side to allow the widened frame portion 31a of the inner frame 30 to be fit-engaged therein, an inner peripheral flange portion 52 which is positioned on the vehicle interior side of the inner peripheral side flange portion 32a of the insertion portion 17a, and an outer peripheral side flange portion 53 which is positioned on the vehicle interior side of the outer peripheral side flange portion 33a of the insertion portion 17a. The lock reinforcement member 50 is provided on a lower portion thereof with a door lock mounting portion 56, to which a door lock mechanism not shown in the drawings is mounted. The fitting depressed portion 51 is provided with an inner peripheral side wall surface 57 which extends along the inner peripheral side wall surface 34 at the widened frame portion 31a of the rear side frame 17, an outer peripheral side wall surface 58 which extends along the widened inclined surface 35a, and a vehicle interior side wall surface 59 which extends along the width-gradually-changing surface 36a. The outer peripheral side wall surface 58 is an inclined surface which corresponds to the widened inclined surface 35a, and the distance between the inner peripheral side wall surface 57 and the outer peripheral side wall surface 58 increases from the side near the frame exterior portion 17b of the rear side frame 17 (from the upper side) toward the side far from the frame exterior portion 17b (toward the lower side).

A welding hole 70 is formed through the width-gradually-changing surface 36a of the inner frame 36. The welding hole 70 is formed as an elongated hole which is elongated in the widthwise direction of the width-gradually-changing surface 36a. In addition, a welding hole 71 is formed through the outer peripheral wall surface 58 of the lock reinforcement member 50. The welding hole 71 is formed as an elongated hole, the elongated direction of which extends in the vertical direction.

Figure 11:
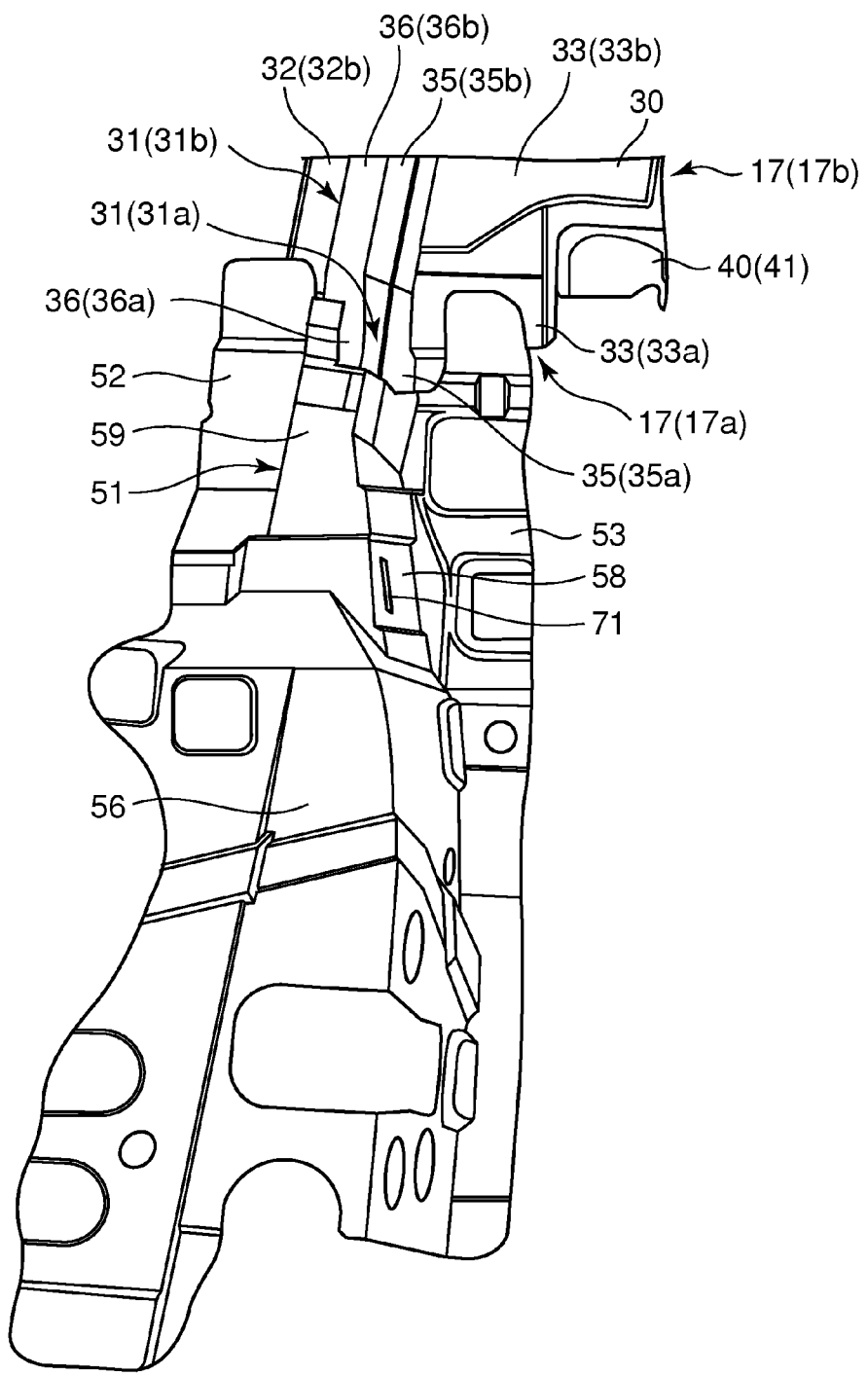
FIG. 11 is a view showing a state where the rear side frame is fixed to the lock reinforcement member, viewed from the vehicle interior side.
Figure 12:
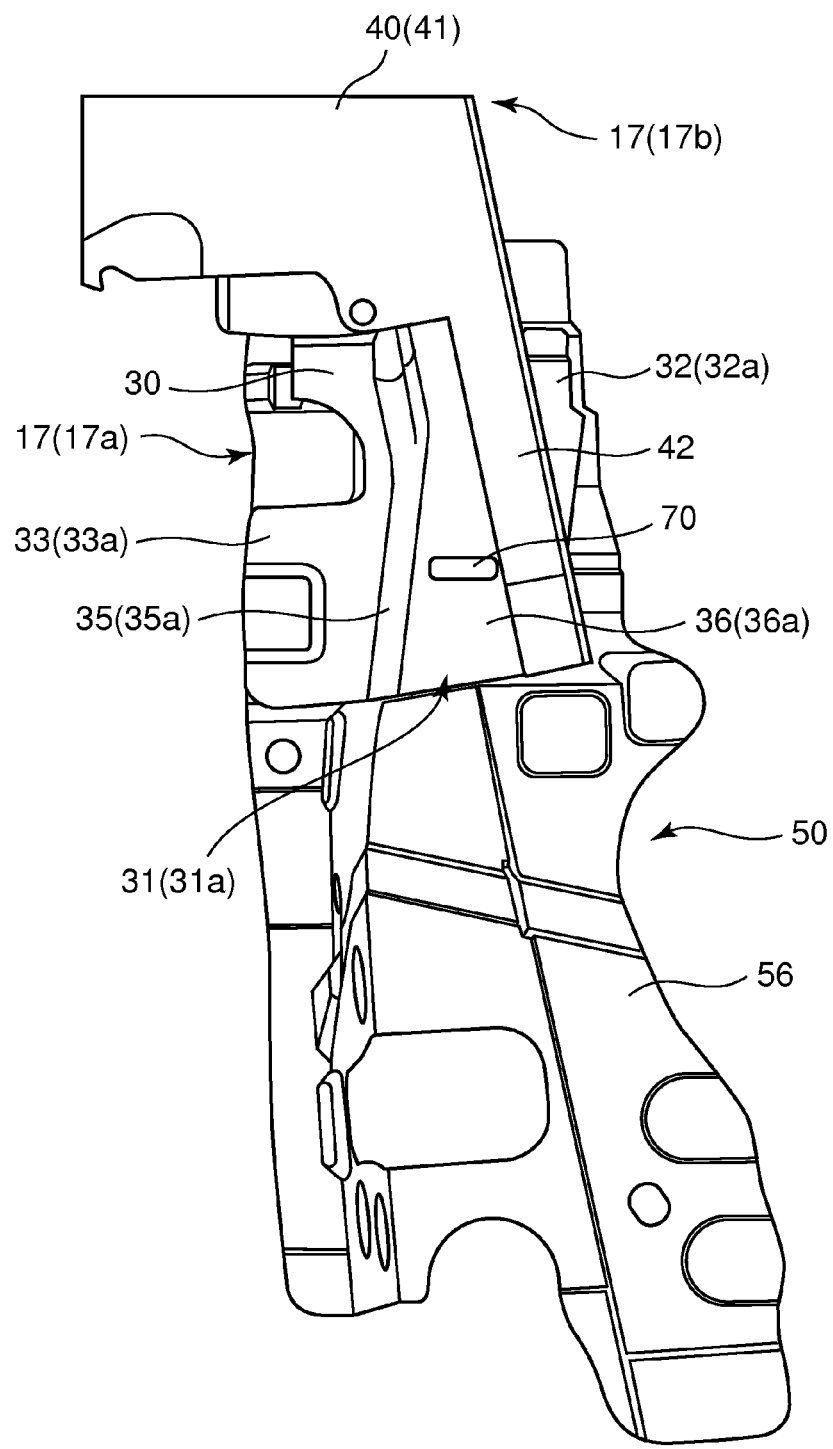
FIG. 12 is a view showing the state shown in FIG. 11, viewed from the vehicle exterior side.
Figure 13:
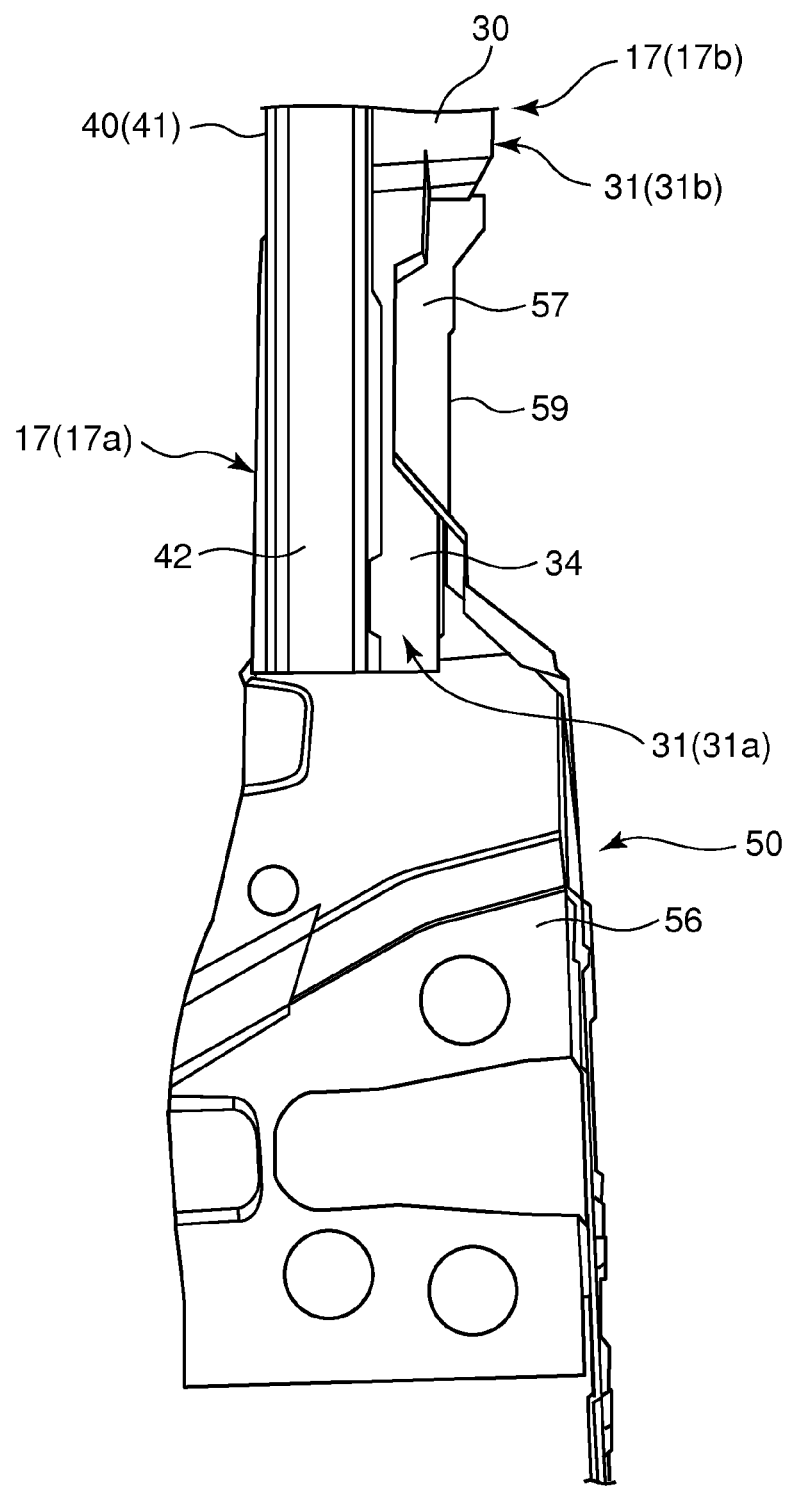
FIG. 13 is a view showing the state shown in FIG. 11, viewed from the front.

The insertion portion 17a of the rear side frame 17 that is formed of a combination of the inner frame 30 and the outer frame 40 is fixed to the lock reinforcement member 50 as shown in FIGS. 11 through 13. The widened frame portion 31a of the inner frame 30 is fitted in the fitting depressed portion 51 of the lock reinforcement member 50, and the outer peripheral side flange portion 33a comes in contact with the outer peripheral side flange portion 53. In regard to the widened frame portion 31a and the fitting depressed portion 51, the inner peripheral side wall surface 57, the outer peripheral side wall surface 58 and the vehicle interior side wall surface 59 of the lock reinforcement member 50 superpose the inner peripheral side wall surface 34, the widened inclined surface 35a and the width-gradually-changing surface 36a of the inner frame 30, respectively, at the cross sectional position shown in FIG. 17, and the outer peripheral side wall surface 58 and the vehicle interior side wall surface 59 of the lock reinforcement member 50 superpose the widened inclined surface 35a and the width-gradually-changing surface 36a of the inner frame 30, respectively, at the cross sectional position shown in FIG. 18. At the cross sectional position shown in FIG. 19, only the widened inclined surface 35a and the outer peripheral side wall surface 58 superpose each other. As shown in FIG. 18, in this mounted state, the widened inclined surface 35a is partly exposed through the welding hole 71 of the lock reinforcement member 50, and this exposed portion is welded. In addition, the vehicle interior side wall surface 59 is partly exposed through the welding hole 70 of the widened frame portion 31a, and this exposed portion is welded. The welding operation on the welding hole 70 is performed with a welding torch inserted into the projecting portion 31 from the vehicle exterior side shown in FIG. 12; the welding operation can be easily performed since the welding hole 70 is formed on the width-gradually-changing surface 36a of the widened frame portion 31a, which is widened to have a greater width than the normal-width frame portion 31b. In other words, since the widened frame portion 31a is wide in width, it is possible to select the inside of the widened frame portion 31a as a portion which is to be welded to the lock reinforcement member 50. In addition, selecting the width-gradually-changing surface 36a and the vehicle interior side wall surface 59 as welding locations increases the welding area and increases the joining strength.

The rear side frame 17 and the lock reinforcement member 50 which have been combined in the above described manner are fixed to the inner panel 22. FIGS. 14 through 16 show a portion of the inner panel 22 in the vicinity of the portion thereof which is fixed to the rear side frame 17 and the lock reinforcement member 50. At this fixing portion, the inner panel 22 has a shape that extends substantially along the lock reinforcement member 50, and the inner panel 22 is provided with a depressed portion 23 which covers the fitting depressed portion 51 of the lock reinforcement member 50 from the vehicle interior side, an inner peripheral side flange portion 24 which covers the inner peripheral side flange portion 52 from the vehicle interior side, and an outer peripheral side flange portion 25 which covers the outer peripheral side flange portion 53 from the vehicle interior side. The depressed portion 23 is provided with an inner peripheral side wall surface 26, an outer peripheral side wall surface 27 and a vehicle interior side wall surface 28 which extend along the inner peripheral side wall surface 57, the outer peripheral side wall surface 58 and the vehicle interior side wall surface 59 of the lock reinforcement member 50, respectively. The inner peripheral side wall surface 26 is formed on only an upper part of the depressed portion 23 (see FIG. 14) and is not shown at the cross sectional positions shown in FIGS. 17 through 19.

Predetermined points on the inner peripheral side flange portion 52 and the outer peripheral side flange portion 53 of the lock reinforcement member 50 are welded to the inner peripheral side flange portion 24 and the outer peripheral side flange portion 25 of the inner panel 22, respectively. More specifically, the lock reinforcement member 50 and the inner panel 22 are welded at points W1, W2, W3 and W4 in FIGS. 14 and 15. W1 shows the points at which only the lock reinforcement member 50 and the inner panel 22 are welded, W2 shows the points at which the lock reinforcement member 50, the inner panel 22 and the inner frame 30 are welded, W3 shows the point at which the lock reinforcement member 50, the inner panel 22 and the inner beltline reinforcement member 18 are welded, and W4 shows the point at which the lock reinforcement member 50, the inner panel 22 and the outer beltline reinforcement member (not shown) are welded.

Accordingly, the fixing of the insertion portion 17a of the rear side frame 17 and the inner panel 22 to each other with the lock reinforcement member 50, which is great in rigidity, being sandwiched therebetween improves the strength of the joined portion between the insertion portion 17a and the inner panel 22. Specifically, the strength has been increased by making the insertion portion 17a and the frame exterior portion 17b, which constitute the rear side frame 17, mutually different in cross sectional shape of the projecting portion 31 and by setting the widened frame portion 31a of the insertion portion 17a to have a widened shape which makes the widened frame portion 31a greater in bending rigidity (second moment of area) than the normal-width frame portion 31b of the frame exterior portion 17b. As also for the fitting depressed portion 51 of the lock reinforcement member 50, which is made to superpose the vehicle interior side of the widened frame portion 31a, and the depressed portion 23 of the inner panel 22, which is made to superpose the vehicle interior side of the fitting depressed portion 51, the bending rigidity has been increased by forming the fitting depressed portion 51 and the depressed portion 23 into a shape which gradually increases in width toward the side far from the frame exterior portion 17b of the rear side frame 17 (toward the lower side) from the side near the frame exterior portion 17b of the rear side frame 17 (from the upper side) to correspond to the widened frame portion 31a. Accordingly, the strength at the point where the widened frame portion 31a, the fitting depressed portion 51 and the depressed portion 23 superpose each other has been improved. In addition, out of the welded points between the lock reinforcement member 50 and the inner panel 22, especially at locations (lower W2, and W4) at one side of the widened frame portion 31a of the inner frame 30 and the fitting depressed portion 51 of the lock reinforcement member 50, the distance from the fitting depressed portion 51, which is high in rigidity, to the welded points is short (the outer peripheral side flange portion 53 is narrow in width), which achieves the effect of increasing rigidity.

FIGS. 20 through 24 show a second embodiment. In FIGS. 20 through 24, portions similar to those in the previous embodiment are designated by the same reference numerals. In addition, only the inner frame 30 of the rear side frame 17 is shown in the drawings; the outer frame 40 is not shown. In this embodiment, a widened frame portion 131a which constitutes part of the insertion portion 17a of the rear side frame 17 is formed into a widened shape by forming the outer peripheral side wall surface 35 from a plurality of widened stepped surfaces 135a which stepwisely change the distance from the inner peripheral side wall surface 34. The widened stepped surfaces 135a are formed so that the widened stepped surface 135a which is positioned lower and farther from the frame exterior portion 17b has a greater distance from the inner peripheral side wall surface 34 than the widened stepped surface 135a which is positioned higher and near to the frame exterior portion 17b. In addition, the vehicle interior side wall surface 36 of the widened frame portion 131a is formed as a width-gradually-changing surface 136a which changes the width thereof in steps by the plurality of lower widened stepped surfaces 135a. The widened frame portion 131a that has such a shape also makes it possible to increase the strength and improve the workability of welding when fixed to the lock reinforcement member 50.

Additionally, in this embodiment, a bead 61 which projects toward the vehicle interior side is formed on the vehicle interior side wall surface 59 of the lock reinforcement member 50. Similar to the improvement of the bending rigidity of the inner frame 30 by the bead 60 of the inner peripheral side flange portion 32a, the bending rigidity of the lock reinforcement member 50 has been improved by the bead 61.

Although the present invention has been illustrated based on the above described embodiments, the present invention is not limited to these embodiments. For instance, the widened frame portion 31a or 131a is made by forming, on a part of the outer peripheral side wall surface 35 of the projecting portion 31 of the rear side frame 17, the widened inclined surface 35a, which is inclined in a direction away from the inner peripheral side wall surface 34, or the plurality of widened stepped surfaces 135a, which are made up of a plurality of stepped surfaces in the above illustrated embodiments; however, it is possible to form an inclined surface such as the widened inclined surface 35a or a surface having steps such as the plurality of widened stepped surfaces 135a on a part of the inner peripheral side wall surface 34. Likewise with the lock reinforcement member 50 and the inner panel 22, the inner peripheral side wall surface 57 and the inner peripheral side wall surface 26 can be formed into inclined surfaces like the outer peripheral side wall surface 58 and the outer peripheral side wall surface 27, respectively.

In addition, although the above illustrated embodiments are examples of application of the present invention to the parts where the rear side frame 17 and the lock reinforcement member 50 are fixed to the inner panel 22, the present invention can also be applied to the parts where the front side frame 16 and the front bracket 19 are fixed to the inner panel 22.

In addition, although the above illustrated embodiments are examples of application of the present invention to a vehicle front door, the present invention can be widely applicable to other doors so long as they have a structure like those of the above described embodiments in which the door frame 12 is inserted into the door panel 11 and fixed thereto.

INDUSTRIAL APPLICABILITY

As described above in detail, the present invention relates to a vehicle door frame which includes an insertion portion which is inserted in between an inner panel and an outer panel, which constitute a door panel, and is supported therebetween; and a frame forming portion which projects from the door panel to form a window opening, wherein the insertion portion is fixed to the inner panel via a reinforcing bracket; additionally, each of the insertion portion and the frame forming portion includes, in a cross sectional shape thereof, a design portion and a projecting portion which projects toward the vehicle interior side from the design portion, and the projecting portion includes a vehicle interior side surface which faces toward the vehicle interior side, and an inner peripheral side surface and an outer peripheral side surface which are spaced from each other toward the inner peripheral side and the outer peripheral side of the door frame, respectively, with the vehicle interior side surface positioned therebetween. In addition, the projecting portion of the door frame has a widened shape which makes the distance between the inner peripheral side surface and the outer peripheral side surface at the insertion portion greater than that at the frame forming portion, and the widened shaped projecting portion is fixed to the reinforcing bracket. Accordingly, the fixing strength between the door frame and the reinforcing bracket can be improved, and the selectivity of welding location between the door frame and the reinforcing bracket is also improved.

REFERENCE SIGN LIST

10 Door
11 Door panel
12 Door frame
15 Upper frame
16 Front side frame
16a Insertion portion
16b Frame exterior portion
17 Rear side frame
17a Insertion portion
17b Frame exterior portion
18 Beltline reinforcement member
19 Front bracket
21 Outer panel
22 Inner panel
23 Depressed portion
24 Inner peripheral side flange portion
25 Outer peripheral side flange portion
26 Inner peripheral side wall surface
27 Outer peripheral side wall surface
28 Vehicle interior side wall surface
30 Inner frame
31 Projecting portion
31a Widened frame portion (width-gradually-changing portion)
31b Normal-width frame portion
32(32a 32b) Inner peripheral side flange portion
33(33a 33b) Outer peripheral side flange portion
34 Inner peripheral side wall surface (inner peripheral side surface)

35 Outer peripheral side wall surface (outer peripheral side surface)
35a Widened inclined surface
35b Reference surface
36 Vehicle interior side wall surface (vehicle interior side surface)
36a Width-gradually-changing surface
36b Reference width surface
40 Outer frame
41 Design surface
42 Glass guide portion
50 Lock reinforcement member
51 Fitting depressed portion (fixed portion)
52 Inner peripheral side flange portion
53 Outer peripheral side flange portion
56 Door lock mounting portion
57 Inner peripheral side wall surface
58 Outer peripheral side wall surface
59 Vehicle interior side wall surface
60 61 Bead
70 71 Welding hole
131a Widened frame portion
135a Widened stepped surfaces
136a Width-gradually-changing surface

The invention claimed is:

1. A vehicle door frame comprising:
    an insertion portion which is inserted in between an inner panel and an outer panel, which constitute a door panel, and is supported therebetween; and
    a frame forming portion which projects from said door panel to form a window opening, wherein said insertion portion is fixed to said inner panel via a reinforcing bracket,
    wherein said door frame includes, at said insertion portion and said frame forming portion, a design portion and a projecting portion which projects toward a vehicle interior side from said design portion,
    wherein said projecting portion is formed from a vehicle interior side surface which faces toward said vehicle interior side, and an inner peripheral side surface and an outer peripheral side surface which are spaced from each other toward an inner peripheral side and an outer peripheral side of said door frame, respectively, with said vehicle interior side surface positioned therebetween,
    wherein said projecting portion has a widened shape which makes a distance between said inner peripheral side surface and said outer peripheral side surface at said insertion portion greater than that at said frame forming portion, and
    wherein said widened shaped projecting portion is fixed to said reinforcing bracket.

2. The vehicle door frame according to claim 1, wherein said projecting portion at said insertion portion is formed into a width-gradually-changing portion which gradually increases said distance between said inner peripheral side surface and said outer peripheral side surface in a direction away from said frame forming portion.

3. The vehicle door frame according to claim 1, wherein said projecting portion at said insertion portion stepwisely increases said distance between said inner peripheral side surface and said outer peripheral side surface toward a side far from said frame forming portion with respect to a side near said frame forming portion.

4. The vehicle door frame according to claim 1, wherein said projecting portion at said insertion portion is provided with a hole, formed in said vehicle interior side surface, for welding said projecting portion to said reinforcing bracket.

5. The vehicle door frame according to claim 1, wherein said reinforcing bracket comprises:
    a fixed portion which is superposed on and fixed to at least said vehicle interior side surface and said outer peripheral side surface of said projecting portion that has said widened shape; and
    a flange portion which extends from said fixed portion in a direction along said design portion, wherein said reinforcement bracket is fixed to said inner panel at said flange portion.

\* \* \* \* \*